United States Patent [19]

Smith

[11] Patent Number: 5,774,652
[45] Date of Patent: Jun. 30, 1998

[54] RESTRICTED ACCESS COMPUTER SYSTEM

[76] Inventor: Perry Smith, 4600 Franklin Avenue, Yellowknife, Northwest Territories, Canada, X1A 2N8

[21] Appl. No.: 720,111

[22] Filed: Sep. 27, 1996

Related U.S. Application Data

[60] Provisional application No. 60/004,569 Sep. 29, 1995 and provisional application No. 60/008,442 Dec. 11, 1995.

[51] Int. Cl. [6] .................................................. G06F 11/00
[52] U.S. Cl. ............................................. 395/186; 705/18
[58] Field of Search .............................. 395/186, 187.01, 395/188.01, 218, 226, 243, 244; 380/3, 4, 23, 25; 705/18, 26, 44; 340/825.34

[56] References Cited

U.S. PATENT DOCUMENTS

| | | | |
|---|---|---|---|
| 4,634,807 | 1/1987 | Chorley et al. | 178/22.08 |
| 4,879,744 | 11/1989 | Tasaki et al. | 379/144 |
| 4,902,881 | 2/1990 | Janku | 235/381 |
| 5,155,768 | 10/1992 | Matsuhara | 380/23 |
| 5,164,982 | 11/1992 | Davis | 379/96 |
| 5,193,110 | 3/1993 | Jones et al. | 379/94 |
| 5,202,997 | 4/1993 | Arato | 395/725 |
| 5,214,695 | 5/1993 | Arnold et al. | 380/4 |
| 5,272,747 | 12/1993 | Meads | 379/59 |
| 5,311,302 | 5/1994 | Berry et al. | 348/14 |
| 5,313,639 | 5/1994 | Chao | 395/188.01 |
| 5,359,660 | 10/1994 | Clark et al. | 380/25 |
| 5,379,421 | 1/1995 | Palazzi, III et al. | 395/600 |
| 5,386,369 | 1/1995 | Christiano | 364/464.01 |
| 5,393,964 | 2/1995 | Hamilton et al. | 235/381 |
| 5,404,393 | 4/1995 | Remillard | 379/96 |
| 5,410,598 | 4/1995 | Shear | 380/4 |
| 5,568,552 | 10/1996 | Davis | 380/4 |
| 5,586,301 | 12/1996 | Fisherman et al. | 395/186 |
| 5,590,198 | 12/1996 | Lee et al. | 380/21 |
| 5,598,531 | 1/1997 | Hill | 395/186 |
| 5,600,818 | 2/1997 | Weikmann | 395/490 |
| 5,610,981 | 3/1997 | Mooney et al. | 380/25 |

*Primary Examiner*—Robert W. Beausoliel, Jr.
*Assistant Examiner*—Joseph E. Palys
*Attorney, Agent, or Firm*—Michael R. Schacht; Hughes, Multer & Schacht, P.S.

[57] ABSTRACT

A restricted access computer system. The system comprises a general purpose computing platform and a control system comprising a control hardware device and a control software program. The control hardware device is connected to the computing platform and to an access-status device such as a coin hopper or the like. The control software program runs on the computing platform and, in a secure mode, replaces the graphical user interface portion of the operating system of the general purpose computing platform. The control hardware device and control software program interoperate to allow access to application software programs on the computing platform only when certain conditions are satisfied. The control hardware device resets the computing platform if the control software program fails to communicate therewith. The control hardware device also restricts operation of the user keyboard and display monitor to reduce the possibility of unauthorized use of the computer system.

24 Claims, 18 Drawing Sheets

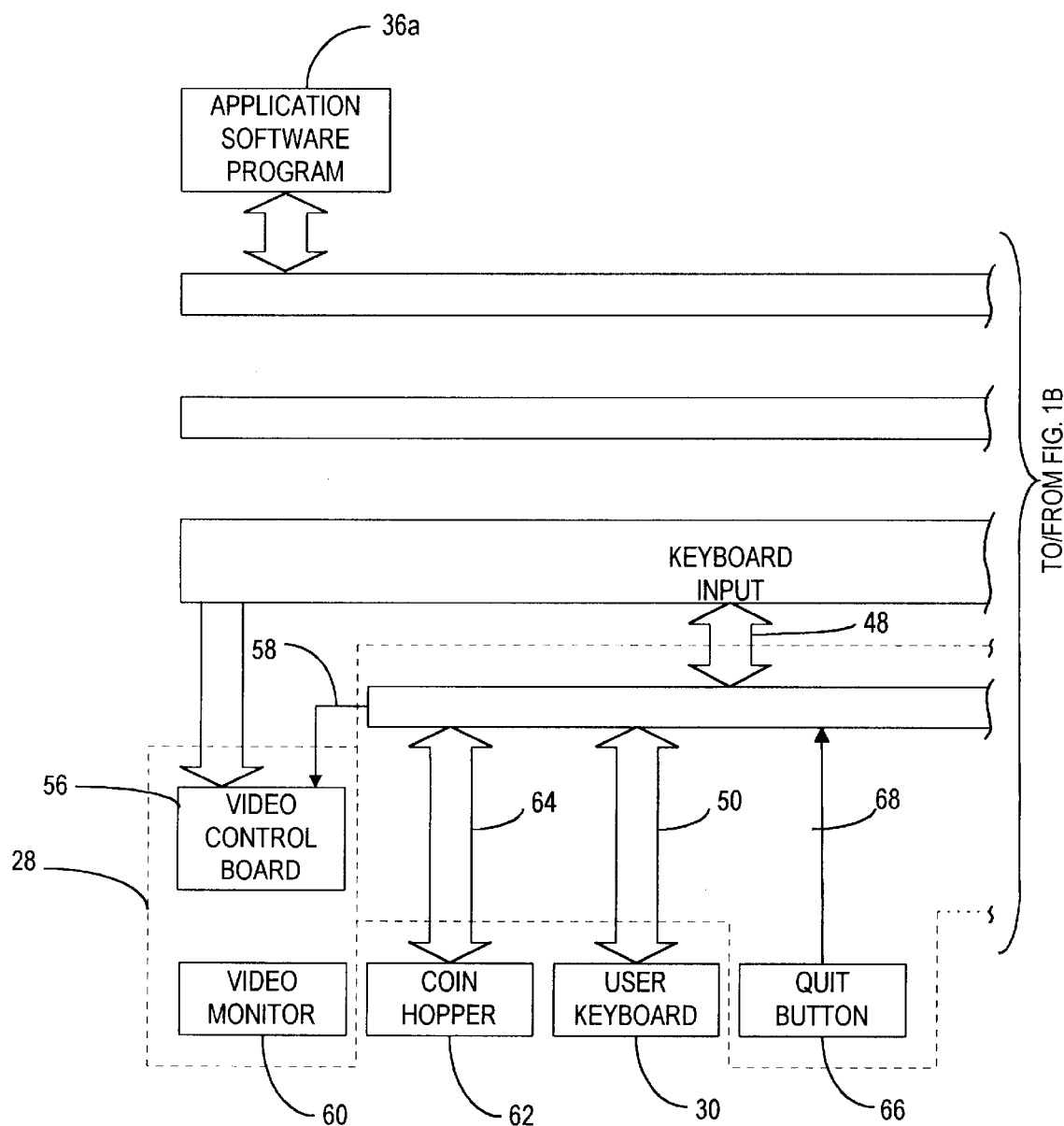

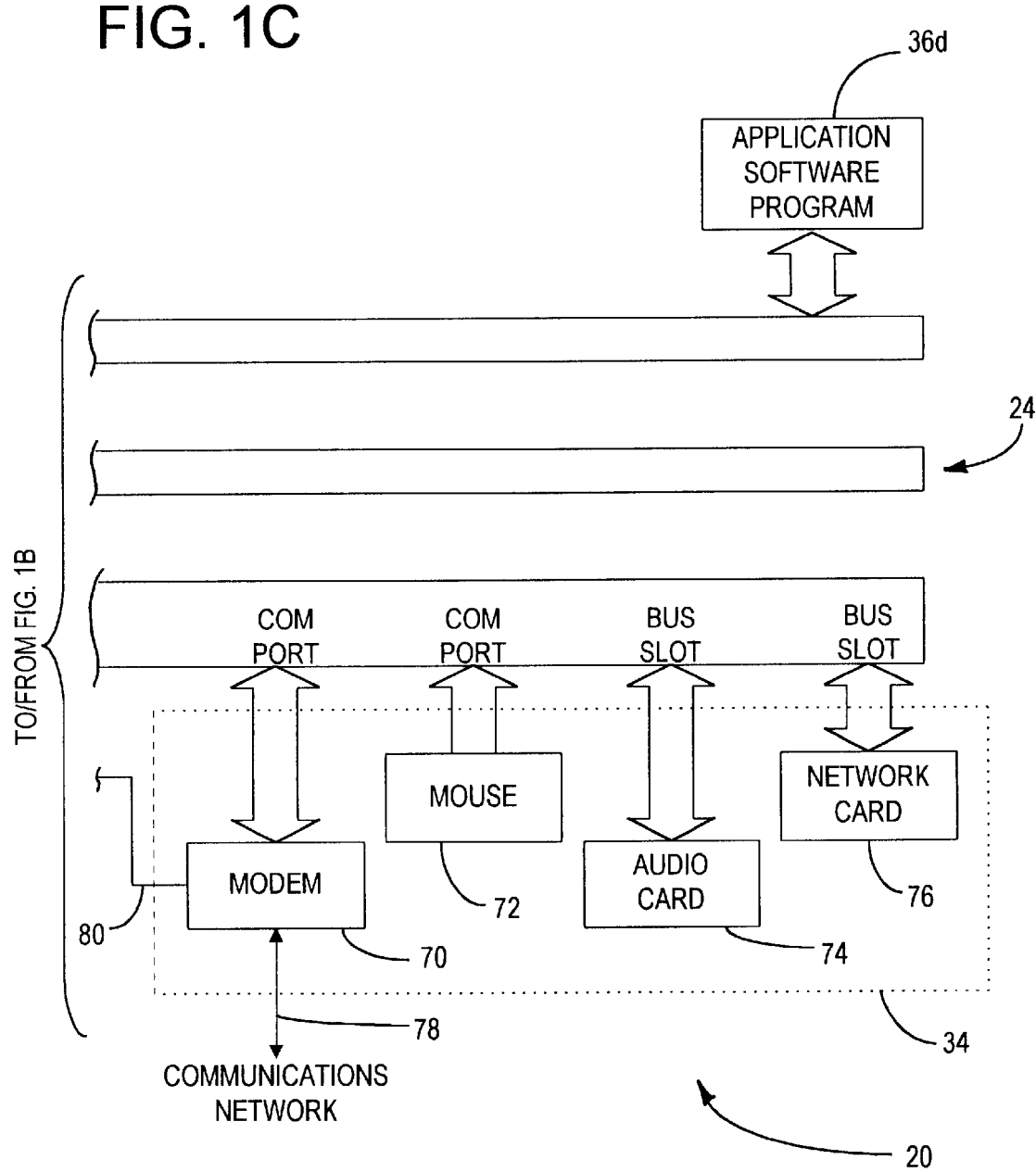

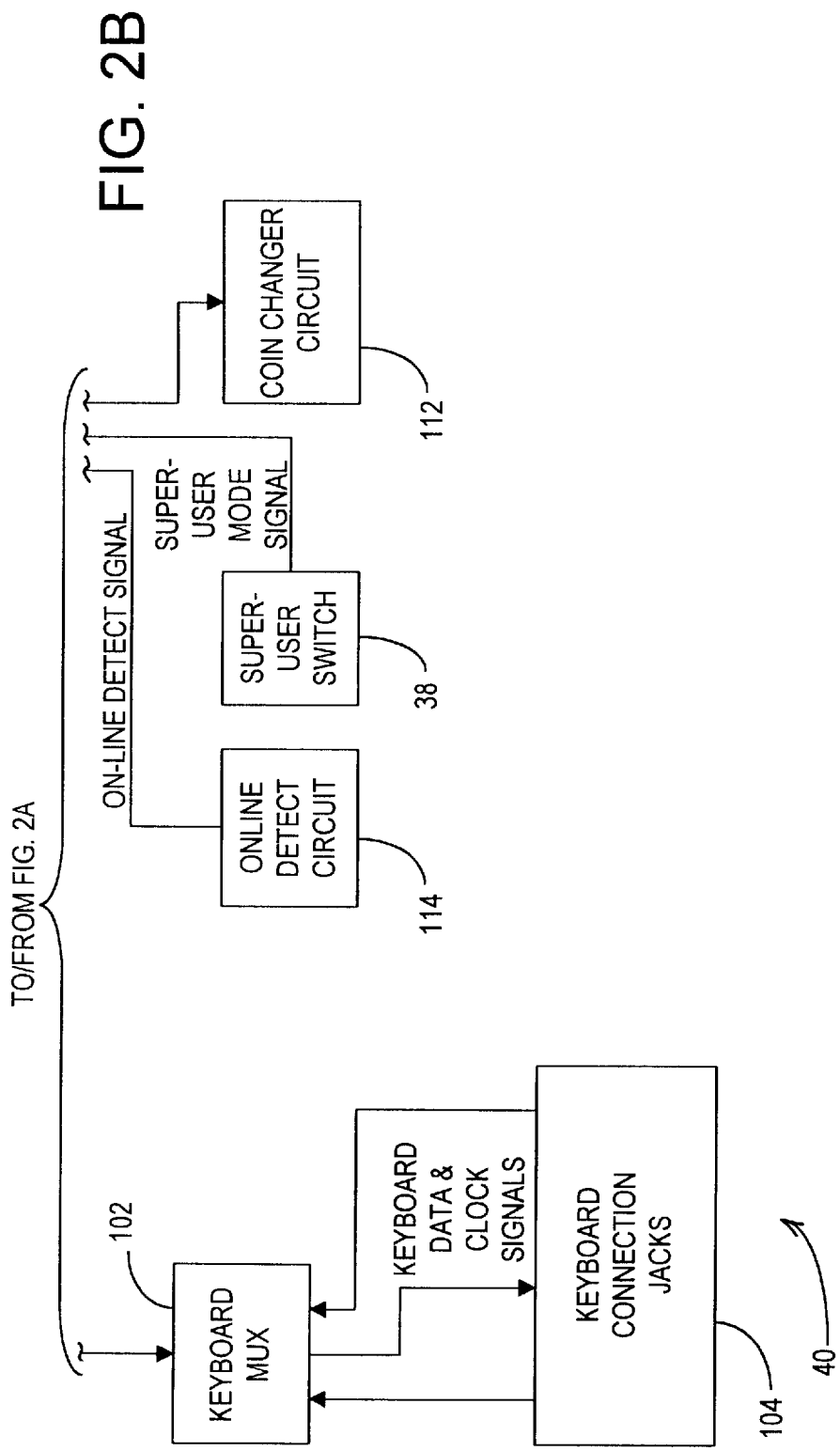

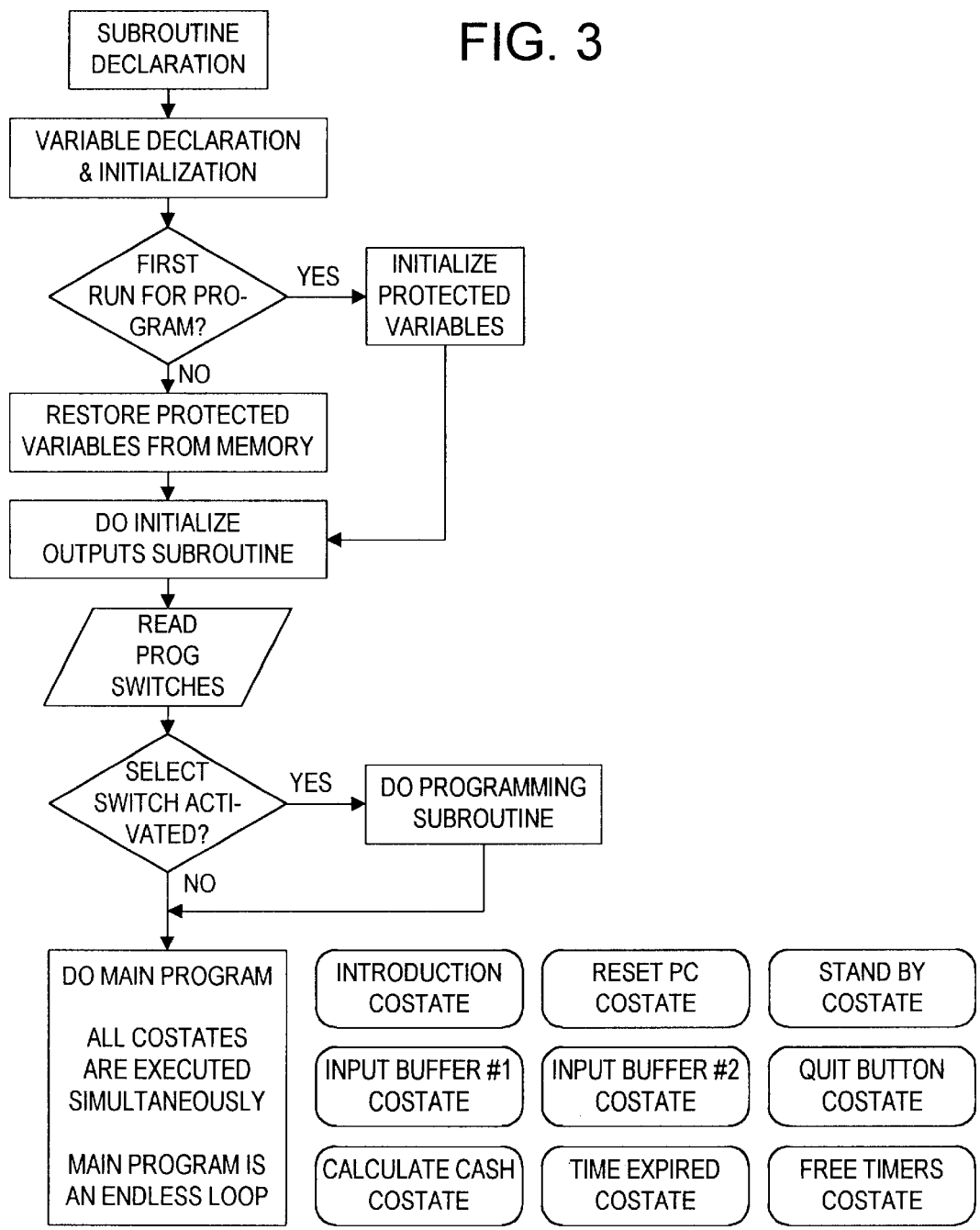

5,774,652

RESTRICTED ACCESS COMPUTER SYSTEM

RELATED APPLICATIONS

This application claims priority of U.S. Provisional patent applications Ser. No. 60/004,569, filed on Sep. 29, 1995, and Ser. No. 60/008,442, filed on Dec. 11, 1995.

TECHNICAL FIELD

The present invention relates to general purpose computers and, more particularly, to such computers the use of which is restricted based on security considerations and/or prepurchase of computer time by the user.

BACKGROUND OF THE INVENTION

In the following discussion, the present invention will be described in terms of a computer system in which a user purchases time on the computer by depositing coins or bills or providing a debit or credit card, and the present invention is of particular use in this environment. The present invention has, however, broader application to other environments in which access to a computer must be restricted. The scope of the present invention should therefore be determined by the claims appended hereto and not the following detailed description.

Currently, cash, credit, or debit operated computing devices are primarily limited-purpose machines that are specifically engineered for use in public venues such as arcades and the like. These devices are specifically engineered for playing a specific game or games; they are not general purpose devices appropriate for running software written on general purpose computing platforms such as Microsoft Windows, Apple MacIntosh, and the like.

Such general purpose computing platforms present, by their very nature, a significant set of security concerns that make difficult their adaptation to public use in an arcade environment. However, many arcade-style games are written primarily, if not exclusively, for general purpose computing platforms. Additionally, many modern computer games are written to take advantage of local networks and, in some cases, for communication networks such as the Internet. The need thus exists for a system that allows a general purpose computing platform to run in a secure environment, unmodified third party software programs such as games and the like in a secure environment.

RELATED ART

A professional patentability search conducted on behalf of the Applicants uncovered the following U.S. patents.

U.S. Pat. No. 5,393,964 to Hamilton et al. discloses a telecommunication booth that allows a user access to a phone, fax, and printer and allows payment for these services by credit card or the like. This patent discloses a dedicated device that would not be able to run third party software designed for a general purpose computer without modification.

U.S. Pat. No. 5,410,598 to Shear discloses a system whereby unauthorized access to a data base is prevented and authorized access to a data base is measured. This patent relates primarily to ensuring that a user pays for usage of a decentralized data base such as a CD-ROM or the like. Payment is based on the amount of usage rather than a flat subscription fee. The purpose of this patent is fundamentally different from that of allowing cash, credit, or debit access to third party applications running on a general purpose computing platform.

U.S. Pat. No. 5,404,393 to Remillard discloses a system that allows access to a variety of services, including electronic mail, and displays images generated from these services on a television. This patent relates to what is referred to as interactive TV, and the credit card information is used for the purchase of goods rather than to pay for computer time.

U.S. Pat. No. 5,379,421 to Palazzi, III et al. discloses hardware for accessing on-line services in which hardware normally available in consumer productsis used as much as possible to reduce the hardware cost. This device is designed for home use and thus is not cash, credit, or debit card operated.

U.S. Pat. No. 5,272,747 to Meads discloses a telephone system that has no relation to general purpose computing platforms.

U.S. Pat. No. 5,164,982 to Davis also is related to an apparatus adapted for use in the home and thus allows access to information services but does not require any provisions for payment on the spot.

U.S. Pat. No. 4,902,881 to Janku is a dedicated device that provides a variety of clerical services such as facsimile, photocopying, electronic mail, document storage, voice mail, and telephone. These services are paid for by credit card billing. This is not a general purpose computing platform and could thus not run third party applications written for such a platform unaltered.

U.S. Pat. Nos. 5,311,302 to Berry et al. and 4,879,744 to Tasaki et al. relate to telecommunications devices that are provisions for credit card access.

U.S. Pat. No. 5,193,110 to Jones appears to be a home-base product that does not require on the spot payment for computer time.

It is respectfully submitted that none of these patents, either alone or in combination, disclose a device that solves the problem discussed above in the Background of the Invention.

SUMMARY OF THE INVENTION

The present invention is a computer system that restricts access by the user to third party applications written for general purpose computing platforms. The present invention may also be embodied in the form of a method of converting a general purpose computing platform into a restricted access computer system.

In particular, the present invention comprises a control hardware device and a control software program. The control hardware device is connected to a communications port of the general purpose computing platform and to a money handling machine such as a coin hopper, bill handler, or credit or debit card reader. The control hardware device employs a microprocessor running a firmware program.

The control program software runs on the general purpose computing platform and communicates with the control hardware device through the communications port. The control hardware device handles all cash handling functions, and the control program software handles functions such as setting up the system, switching among various third party application software programs, and other functions necessary to allow the general purpose computing platform to work in a secure, restricted mode.

The control program software and control hardware device are in constant communication during normal operation. In the event that this communication is disrupted for any reason, the hardware control device is connected to the computer hardware to execute a hard reset and reboot the system. This prevents unauthorized users from terminating the control program software and having unrestricted access to the general purpose computing platform.

The hardware control device is also connected between the general purpose computing platform and the user keyboard and video monitor. The control hardware device inhibits operation of the video monitor and user keyboard under certain circumstances to ensure that unauthorized users cannot have unrestricted access to the computing platform and cannot watch the boot-up sequence executed by the computing platform under the control of the control program software.

In normal operation, the user cannot quit the control program software or change its status from either an attract mode in which access is denied or a paid mode in which the user has access to the application software programs. To allow maintenance of the system such as the loading of new application software programs, the system provides a superuser button that allows the control program software to be put into a superuser mode. The superuser button is located on the control hardware device, which is enclosed in a locked case and thus does not allow physical access to the superuser button to unauthorized users.

When the control program software has been loaded on the computer and the computer boots up, the control program software takes over, and the user's choices are restricted to those allowed by the control program software. In this situation, the control program software will normally displace a standard desktop portion of the operating system for the general purpose computing platform. When the system is turned on, the control program software goes into its attract mode until the control hardware device detects that the user has credit by, for example, dropping coins into a coin hopper or feeding a credit card through a credit card reading device. Once the control hardware device determines that the user has credit, it allows the control program software to go into paid mode in which access to the application software programs is allowed. The control hardware device keeps track of any additional money credit and gives the user a limited amount of time to access the application software programs based on the amount of monetary credit.

Certain application software programs require access to communication network such as the Internet. Such access requires going through an internet service provider which, in most cases, entails additional cost. In these situations, a higher charge rate is used. The control hardware device is therefore connected to the system modem to determine whether the modem is in use. If the modem is not in use, the control hardware device uses a first, or lower, charge or use rate. If the modem is in use, the control hardware device uses the second, higher charge or use rate.

BRIEF DESCRIPTION OF THE DRAWINGS

FIGS. 3–12 are logic flow diagrams graphically illustrating the operation of the firmware running on the microprocessor of the circuit depicted in FIG. 2.

DETAILED DESCRIPTION

Figure 1B:
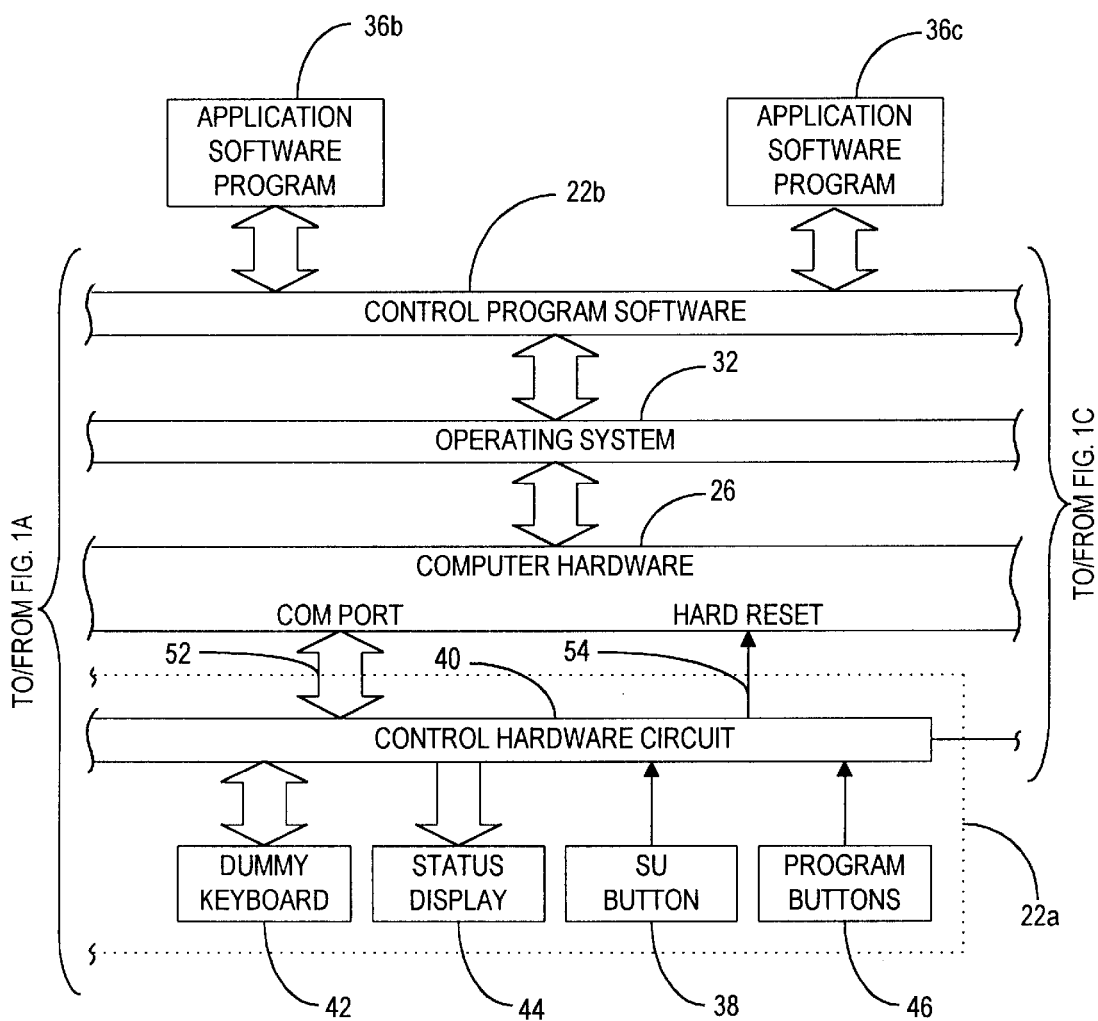
FIG. 1 is a block diagram showing a restricted access computer system constructed in accordance with, and embodying, the principles of the present invention.

Referring initially to FIG. 1 of the drawing, shown at 20 therein is a restricted access computer system constructed in accordance with, and embodying, the principles of the present invention. The computer system 20 comprises two basic components; the first is an access control system 22 comprising a hardware portion 22a and a software portion 22b; the second major portion is a general purpose computing platform 24. This general purpose computing platform 24 basically comprises computer hardware 26, a display or output subsystem 28, a user keyboard or input subsystem 30, and an operating system 32. The hardware transmits user output data to the display subsystem 28 and receives user input data from the keyboard 30. Connected to the platform 24 is a set of peripheral devices 34. The system also comprises a plurality of software programs 36 designed to run on the platform 24.

The exemplary general purpose computing platform 24 is an industry standard IBM compatible ISA computer having a Pentium processor, a 1.6 gigabytes hard drive, a 3½ inch floppy drive, and 16 megabytes of random access memory. This system is in all respects conventional. The construction and operation of this platform 24 is well understood in the art, as are the interconnections between this system 24 and the peripherals 34. The system 24 and peripherals 34 will thus not be explained herein beyond what explanation is necessary for a complete understanding of the present invention.

The restricted access computer system 20 operates basically as follows. The operating system 32 is modified such that, when the platform 24 boots up, all input from the user keyboard 30 and all output to the video subsystem 28 passes through the control program software 22a. In the context of a computer running Windows 95, the user will not see the Windows 95 desktop upon booting up the system; rather, the user will be presented with an interface generated by the control program software 22b.

The control program software 22b communicates with the control program hardware 22a to determine whether the user should be given access to the application software programs 36. If not, the control program software 22a remains in an attract mode in which the user keyboard 30 is disabled, and the control software program 22a displays information on the video subsystem 28 to instruct potential users how to begin operating the system 20 and the capabilities thereof. When the control hardware device 22a determines that the user shall be given access to the application software programs 36, the control hardware device 22a instructs the control program software 22b to shift into a paid mode in which the user keyboard 30 is enabled and the user is allowed to select one or more of the application software programs 36 and run these programs.

When the control hardware device 22a determines that the user is no longer to be given access to the application software programs 36, the control hardware device 22a will instruct the control program software 22b to revert to the attract mode, while at the same time locking out the user keyboard 30.

During the whole time that the system 20 is operating normally, communication is continually maintained between the control program software 22b and the control hardware device 22a. If this communication is disrupted for any reason, the control hardware device detects this disruption and generates a command to reboot the computer hardware 26. Thus, if an unauthorized user attempts to obtain control of the system 20 by shutting down the control program software 22b, the computer platform 24 will reboot, preventing such unauthorized access.

Whenever the platform 24 boots up or reboots, the control hardware device 22a disables the video subsystem 28 to prevent potential unauthorized users from viewing the bootup sequence normally displayed during such bootup. At the same time, the user keyboard 30 is disabled.

The control program software operates, in addition to the attract and paid modes, in a superuser mode in which maintenance on the system 20 may be performed. To prevent unauthorized users from switching the control program software 22b into its superuser mode, switching into this mode is controlled by the control hardware device 22a. In particular, the hardware device 22a comprises a superuser button 38 that is physically located on the control hardware device and locked away from the users. Access to this button is provided only to persons having an appropriate key. Such persons may press the superuser button and force the control program software 22b to go into its superuser mode.

With this basic understanding of the system 20 in mind, the details of operation and installation of the control system 22 will now be described in further detail.

Referring again for a moment to FIG. 1, it can be seen that the control hardware device 22a comprises a control hardware circuit 40, a dummy keyboard circuit 42, a status display 44, the superuser button 38, and a number of specialized program buttons 46.

The hardware device 22a is connected to various hardware devices of the system 20. The hardware device 22a is connected by a cable 48 to a keyboard input of the computer hardware 26 and by a cable 50 to the user keyboard 30. Thus, any signals passing from the keyboard 30 to the keyboard input of the computer hardware 26 must pass through the control hardware circuit 40.

The control hardware circuit 40 is additionally connected to a communications port of the computer hardware 26 by a communications link 52. This link 52 is established in a conventional manner and allows the control hardware circuit 40 to communicate with the control program 22b in a conventional manner.

The control hardware circuit 40 is additionally connected by a cable 54 to a hard reset circuit of the computer hardware such that the control hardware device 22a may reset or reboot the computer platform 24 when necessary. The control hardware circuit 40 is additionally connected to a video control board 56 of the video subsystem 28 by a video control line 58. The video control line 58 allows the computer hardware circuit 40 to control the video control board 56 to switch on and off the brightness of a video monitor 60. This allows the control hardware circuit 40 to prevent users from viewing the status of the system 20 when appropriate.

The control hardware circuit 40 is additionally connected to a coin hopper 62 by a cable 64. The control hardware circuit 40 has low level access to the functions of the coin hopper 62. This allows the control hardware circuit 40 to determine status questions relating to the coin hopper such as whether the hopper contains any coins for refund purposes, whether any coins are deposited therein, and whether any coins should be refunded thereby.

The control hardware device 22a further comprises a quit button 66. This allows the user to send a quit signal directly to the control hardware circuit 40 through a line 68. If desired or necessary because of an inability to communicate through the user keyboard 30.

As discussed above, a number of peripherals 34 are connected to the computer hardware 26. These peripherals include a modem 70, a mouse 72, and audio card 74, and a network card 76. The modem 70 is connected to a communications network by a telephone line 78 and to the control hardware circuit 40 by a telephone line 80. This connection 80 allows the control hardware circuit to, at a minimum, detect when the modem 70 is in use. The modem 70, mouse 72, audio card 74, and network card 76 are in all other respects conventional and will not be described herein in further detail.

Figure 2A:
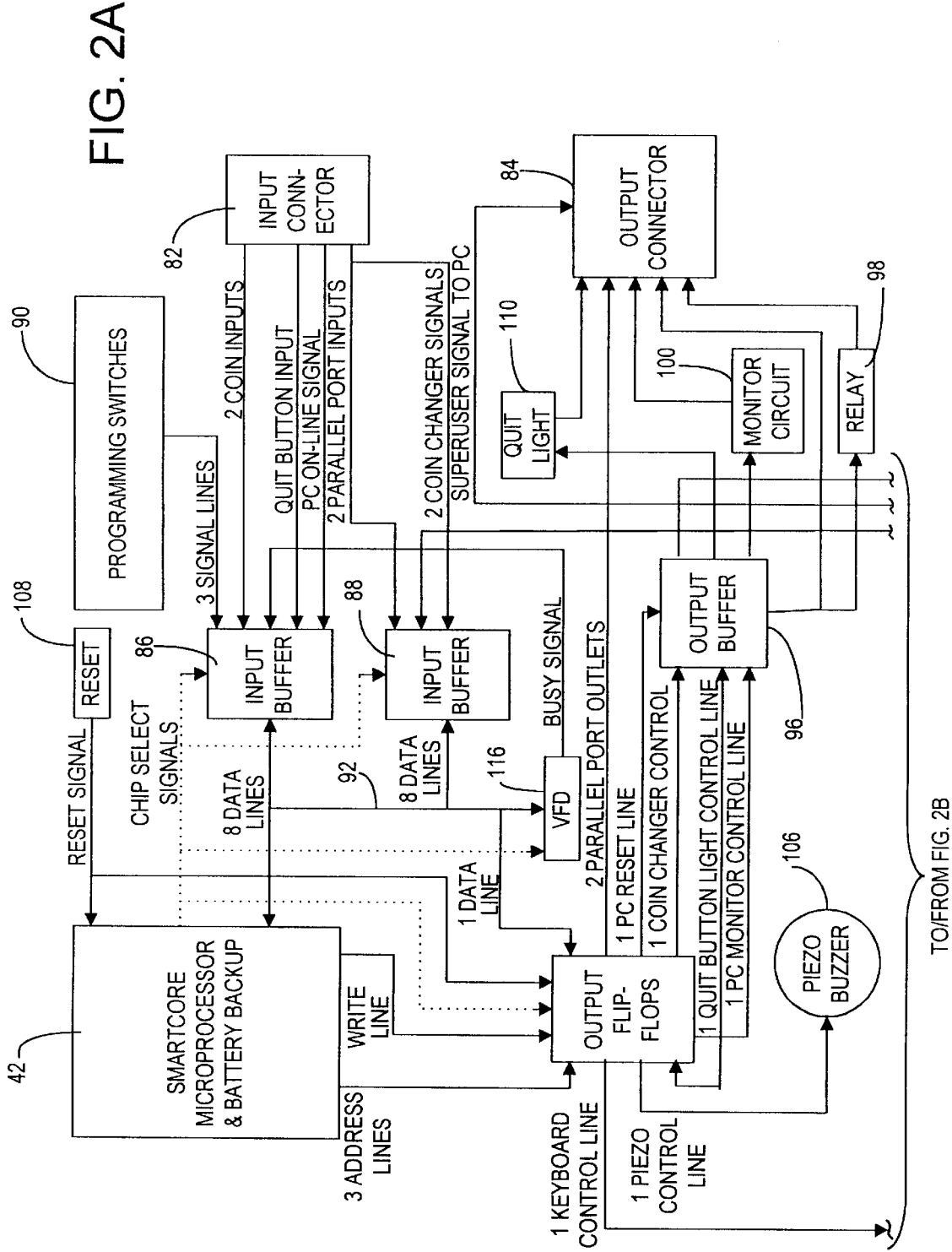
FIG. 2 is a block diagram of a control hardware circuit 40 of the system 20.

Referring now to FIG. 2, depicted therein is a block diagram of the control hardware circuit 40. This circuit 40 is constructed around a microprocessor 42. This microprocessor 42 executes firmware that will be described in further detail below.

The remaining components of the control hardware circuit 40 perform the following basic functions: to allow the microprocessor 42 to communicate with various other hardware components of the system 20; to allow users to communicate directly with the microprocessor 42 as necessary; and to provide limited feedback regarding the state of the microprocessor 42 to the user. To this end, the remaining components of the system 40 are basically conventional and will not be described herein in detail.

Initially, the circuit 40 comprises an input connector 82 and an output connector 84. These connectors 82 and 84 allow the physical transfer of data to the communications link 52 described above. Input buffers 86 and 88 are connected to the input connector 82. A set 90 of programming switches, including a program start button and program up and program down buttons, are also connected to the input buffer 86. These buffers 86 and 88 are connected to a data bus 90 which is in turn connected to the microprocessor 42. This bus 90 allows the microprocessor 42 to determine the state of the input buffers 86 and 88.

The output connector 84 is connected to output flip-flops 94 directly in through an output buffer 96. A relay 98 enables the microprocessor 42 to toggle the hard reset of the computer hardware 26. A monitor circuit 100 determines the status of the computer hardware 26.

The output flip-flops are additionally connected to a keyboard multiplexer that switches either the user keyboard or the dummy keyboard to the keyboard input of the hardware 26. The keyboard mux 102 is thus connected to a set of keyboard connection jacks 104 and operates under control of the microprocessor 42. A piezo buzzer 104 is connected to the output flip-flops 94 to allow the microprocessor 42 to sound an audible alarm when necessary.

A reset button 106 is connected to the microprocessor 42 and to the output flip-flops 94 to provide a hard connection to allow the computer hardware 26 to be reset. A quit light circuit 110 is connected between the output buffer 96 and the output connector 84 to indicate the status of the quit button 66.

The output buffer 96 is additionally connected to a coin changer circuit 112 of the coin hopper 72. An on-line detect circuit 114 is connected to the telephone line 80 and generates an on-line detect signal whenever the modem 70 goes on-line. The on-line detect circuit 114 is in communication with the input buffer 88 to communicate the on-line detect signal to the microprocessor 42.

The superuser button 38 generates a superuser mode signal which is transmitted directly to the output connector 84. When the button 38 is depressed, the superuser signal is transmitted directly to the PC where it is available to the control program software.

A VFD circuit 116 is connected to the bus 92 and generates a busy signal depending on the status of the bus 92. The VFD circuit transmits this busy signal to the input buffer 86 where it is available to the microprocessor 42.

As mentioned above, the microprocessor 42 executes a firmware program that implements the logic necessary to obtain the general operation of the system 20 described above. This firmware program comprises a main program and nine costates routines. The main program is run in an endless loop and is graphically depicted in the flow chart of FIG. 3.

As depicted in FIG. 3, the main program initializes a number of variables, reads program switches to determine whether the user wishes to enter a programming subroutine to perform various accounting procedures, and then enters an endless loop during which the nine costates discussed above are simultaneously executed.

The main program employs the subroutines set forth in Exhibit C.

Referring now to FIGS. 4–12, the nine costates in which the firmware operates will be discussed in further detail.

Figure 4:
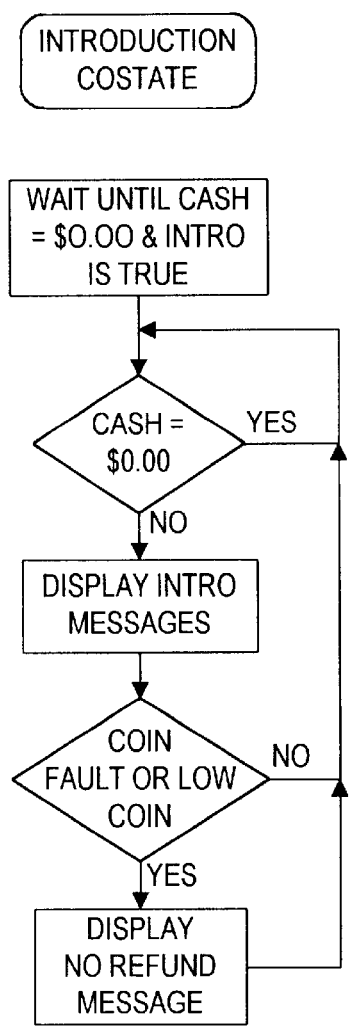
Figure 5:
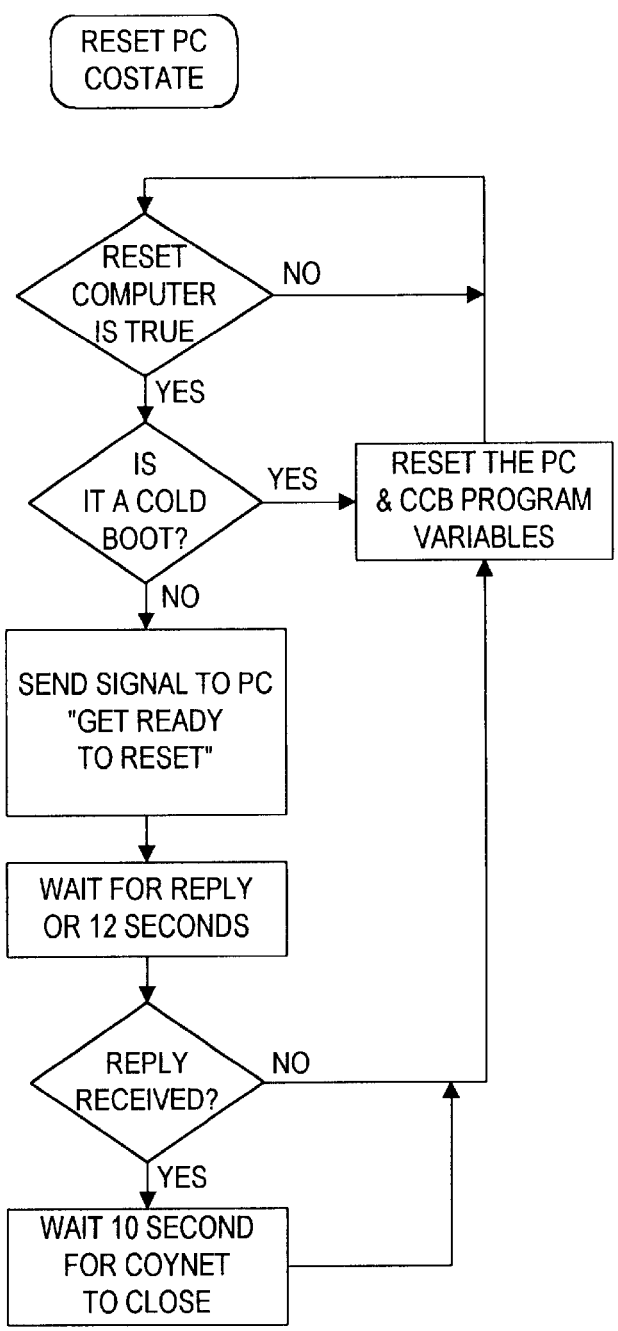

Referring initially to FIG. 4, depicted therein is the introduction costate. As long as the user has no cash credit, the introduction costate remains in a standby loop. The introduction costate also displays a no refund message if there is a problem with the coin handling mechanism or if insufficient coins are in the hopper to make a refund.

Referring now to FIG. 4, depicted therein is a reset PC costate. If the variable reset computer is true, the microprocessor sends a signal to the PC advising it to get ready to reset. After the PC responds or 12 seconds passes, the microprocessor 40 immediately resets the computer hardware 26 if no reply is received therefrom and waits 10 seconds to reset the computer hardware 26 if a reply is received. The reset PC costate immediately reboots the computer hardware if it is a cold boot.

Figure 6:
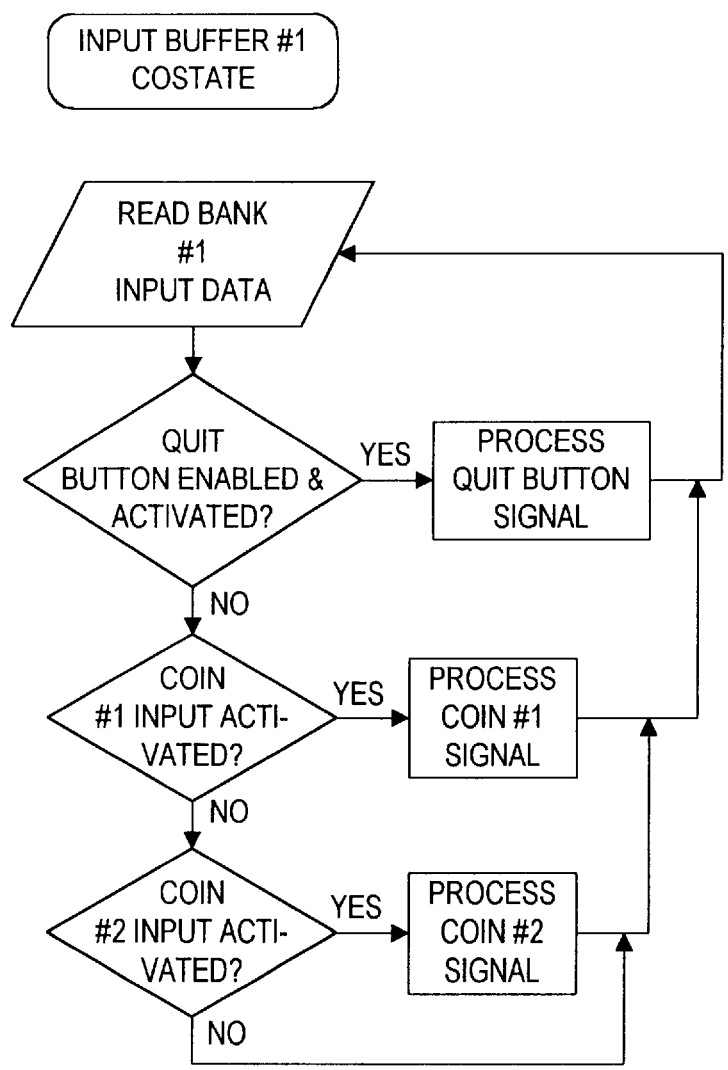

The input buffer No. 1 costate is depicted in FIG. 6. This costate initially reads the input buffer 86 to determine whether the quit button 66 is enabled and activated. If it is, the input buffer No. 1 costate processes the quit button signal. If it is not, the input buffer No. 1 costate determines whether a coin No. 1 input is activated. If so, this costate processes the coin No. 1 signal and returns to the initial step of reading the bank No. 1 input data from the input buffer 86. If the coin No. 1 is not activated, this costate determines whether a coin No. 2 input is activated. If it is, it processes the coin No. 2 signal and returns to the initial step. If it is not activated, it returns directly to the initial step.

Figure 7:
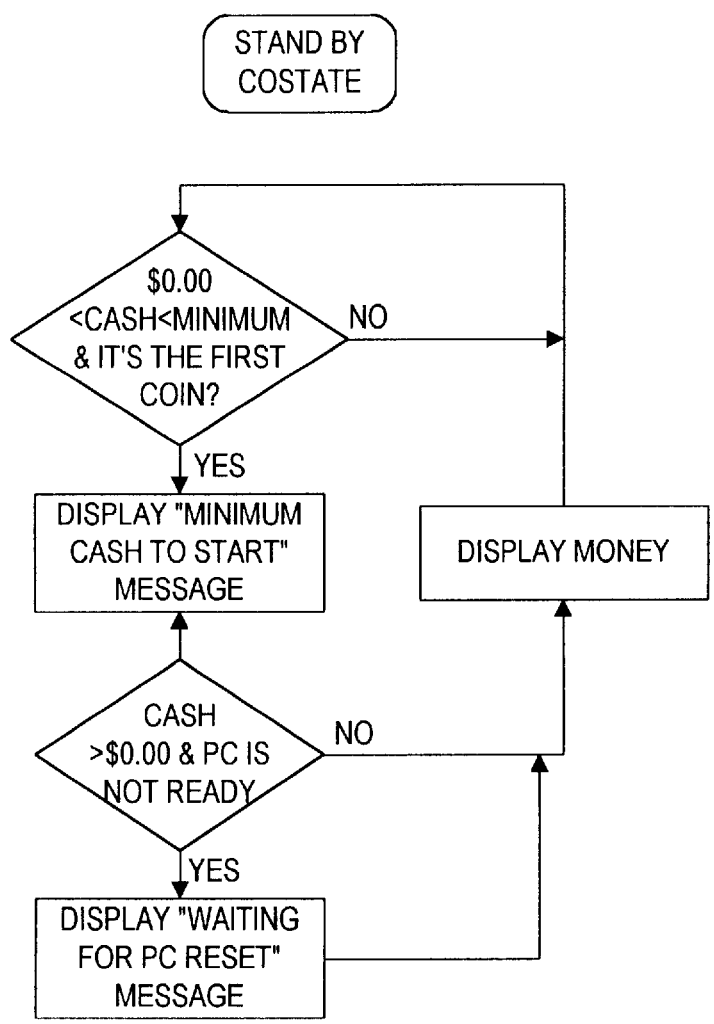

The standby costate is depicted in FIG. 7. This costate initially determines whether the cash variable is greater than zero and less than the minimum cash value and if this is the first coin. If these conditions are not met, this step is repeated. If they are met, a minimum cash to start message is displayed to the user. The standby costate then also determines whether cash is greater than zero and the PC is not ready. If so, a waiting for PC reset message is displayed. If not, the amount of money available is displayed.

Figure 8:
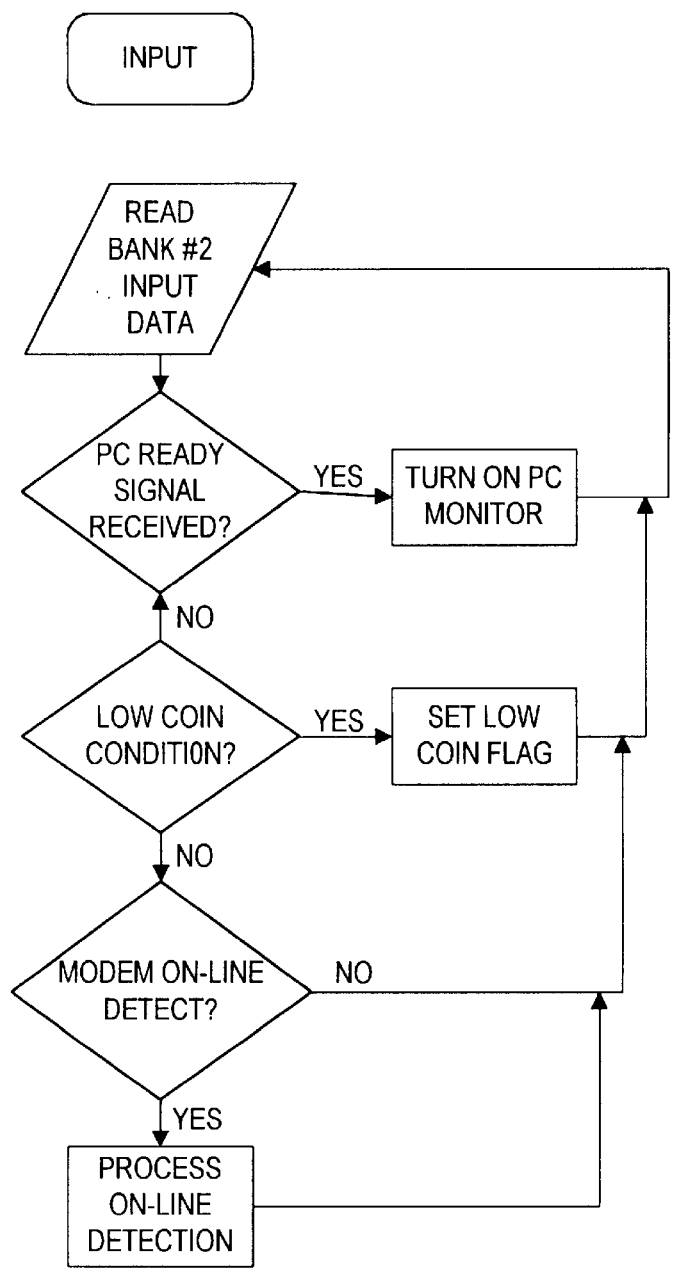

FIG. 8 depicts a flow chart representing the input buffer No. 2 costate. This costate begins with the step of reading the bank No. 2 input data from the input buffer 88. If a PC ready signal is received, this costate turns on the PC monitor and returns to the initial step. If the PC ready signal is not received, this costate proceeds to determine whether a low coin condition exists. If so, the costate sets a low coin flag and returns to the initial step. If not, this costate detects whether the modem is on-line or off-line. If it is off-line, the costate simply returns to the initial step. If it is on-line, the costate processes the on-line detection and returns to the initial step.

Figure 9:
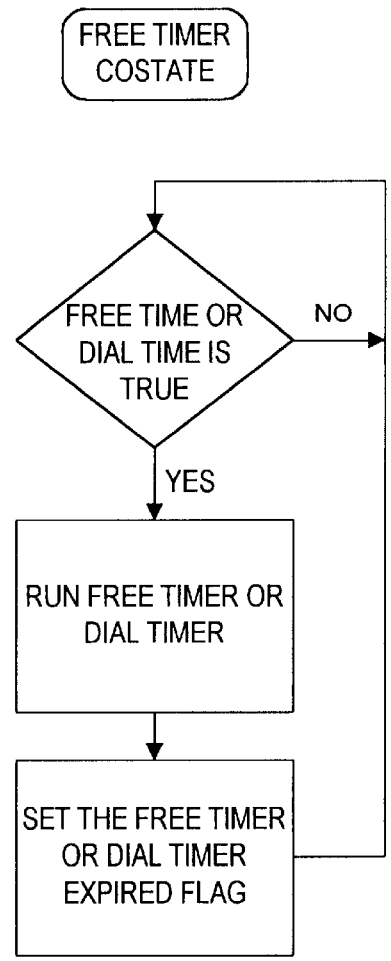

Referring now to FIG. 9, depicted therein is a free timer costate. This costate sets a flag that indicates whether a period of free time has expired. This free time is given to allow the system to reset itself and/or when the system is dialing into an Internet service provider.

Figure 10:
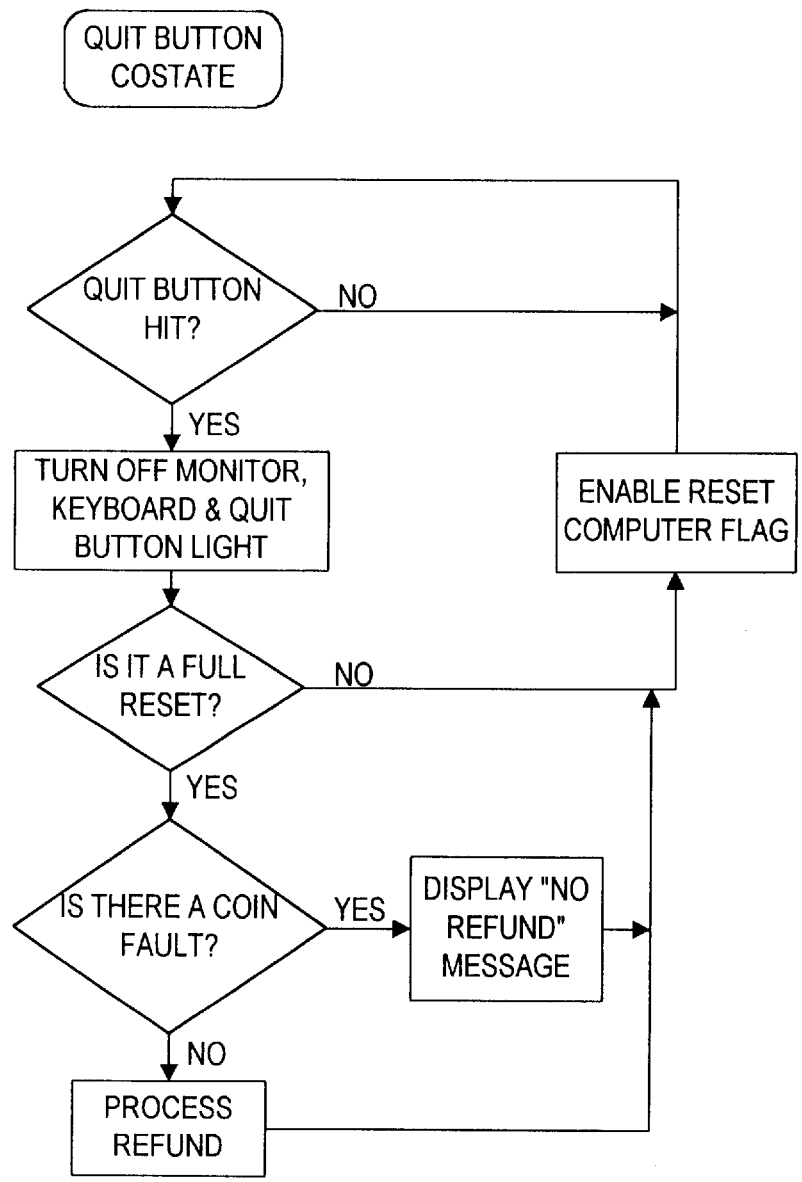

Referring now to FIG. 10, depicted therein is a quit button costate. This costate starts by determining whether the quit button has been depressed. If not, it simply repeats the first step. If this button has been hit, the monitor, keyboard, and quit button light are turned off. The costate then determines whether this is a full reset. If not, a reset computer flag is enabled and the costate returns to its initial state. If the costate determines that it is a full reset, the next step is to determine whether there is a coin fault. If not, a refund is processed, the reset computer flag is enabled, and the costate returns to the initial step. If there is a coin fault, the costate displays a no refund message, enables the reset computer flag, and returns to the initial step.

Figure 11:
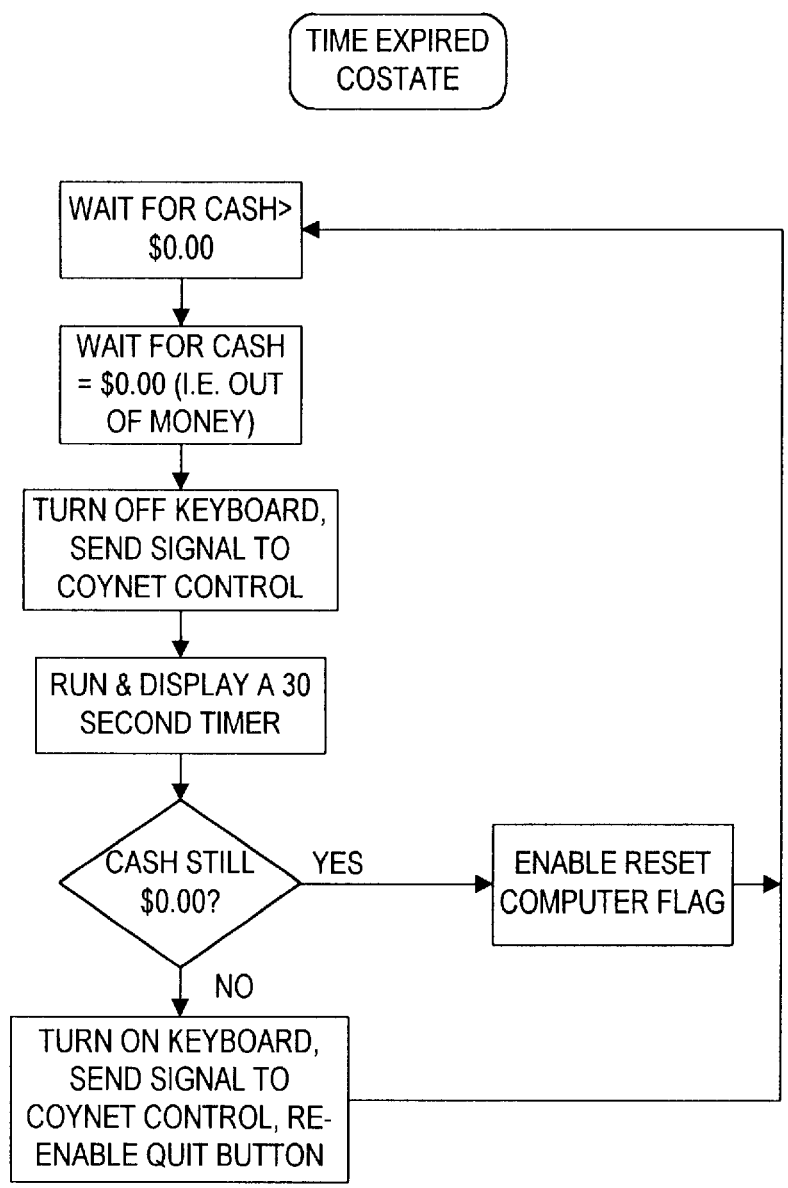

Referring now to FIG. 11, depicted therein is a time expired costate. This costate starts by waiting until cash is greater than zero. As soon as cash becomes greater than zero, the costate moves to a step where it waits for cash to be equal to zero. This indicates that the user is out of credit and further access to the computer platform 24 is not authorized. When cash equals zero, the keyboard is turned off and a signal is sent to the Coynet control. The system then waits for 30 seconds and, if the cash is still equal to zero, enables the reset computer flag and returns to the initial state. If the cash is not zero after the 30 second delay, the keyboard is turned back on, the Coynet control software program is notified, and the quit button is reenabled. The costate then returns to the initial step.

Figure 12:
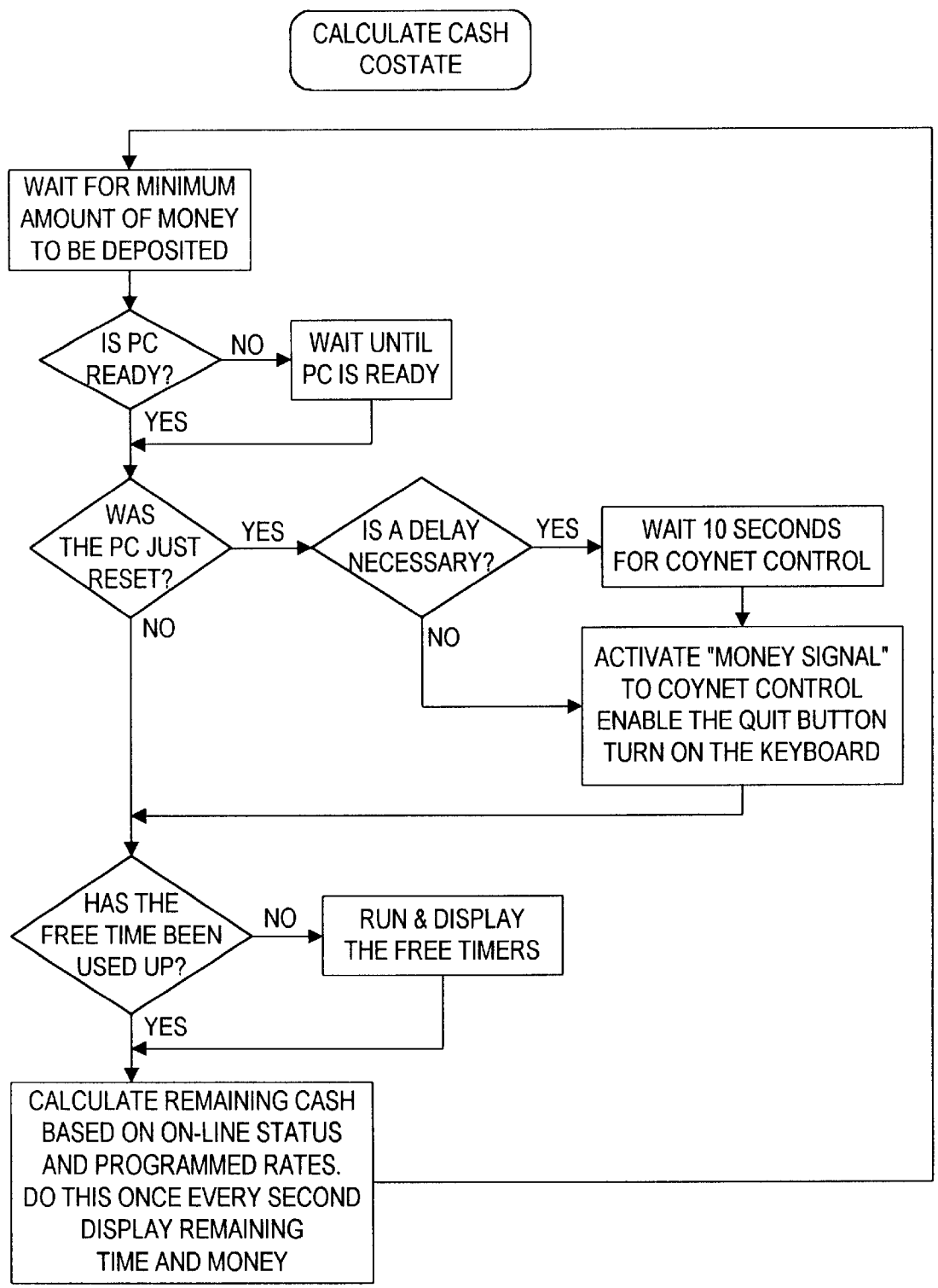

Referring now to FIG. 12, the calculate cash costate will be explained. This costate initially waits until a minimum amount of money is deposited. The costate then determines whether the PC is ready. If it is ready, the costate moves to a step of determining whether the PC was just reset. If the PC is not ready, the costate waits until the PC is ready and then moves to the step of determining whether the PC was just reset. If the PC was not just reset, the costate moves to a step where it is determined whether any free time available has been used up. If the free time has been used up, the calculate cash costate calculates the remaining cash based on on-line status and programmed rates. This is done every second while displaying the remaining time and money. If the free time has not been used up in the previous step, the calculate cash costate displays the free timers and then moves on to the step of calculating the remaining cash.

If earlier in the logic tree the calculate cash costate determines that the PC was just reset, the costate moves to a step where it determines whether a delay is necessary. If so, the costate waits for 10 seconds and then it activates a money signal which is passed to the control software program. The costate then enables the quit button and turns on the keyboard. If a delay is not necessary, the costate moves directly to the step of transmitting the money signal to the software control program, enabling the quit button, and turning on the keyboard. At this point, the costate proceeds to the step of determining whether free time has been used up as discussed above.

Referring now to FIGS. 13–17, depicted therein are flow charts graphically illustrating the logic flow of the control program software 22b.

Figure 13:
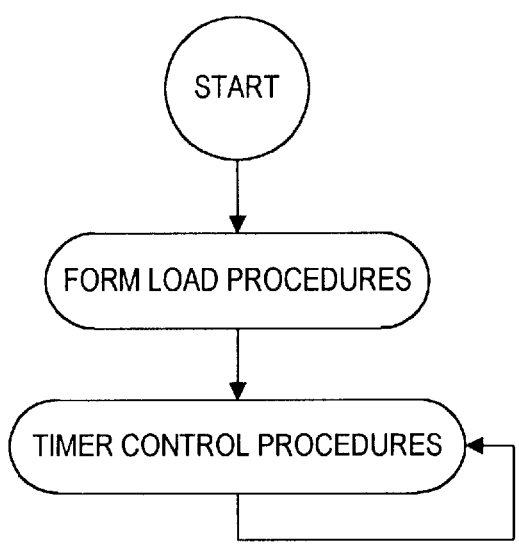
FIGS. 13–17 are similar logic flow diagrams depicting the operation of a control program software portion of the system shown in FIG. 1.

Referring initially to FIG. 13, depicted therein are the main procedures executed by the control program software. After the program is started, the control program software runs a form load procedure that sets up and initializes the program. The main program then moves to timer control procedures that runs in a constant loop until this loop is disrupted either by customer interaction or by the program itself causing a shutdown.

Figure 14:
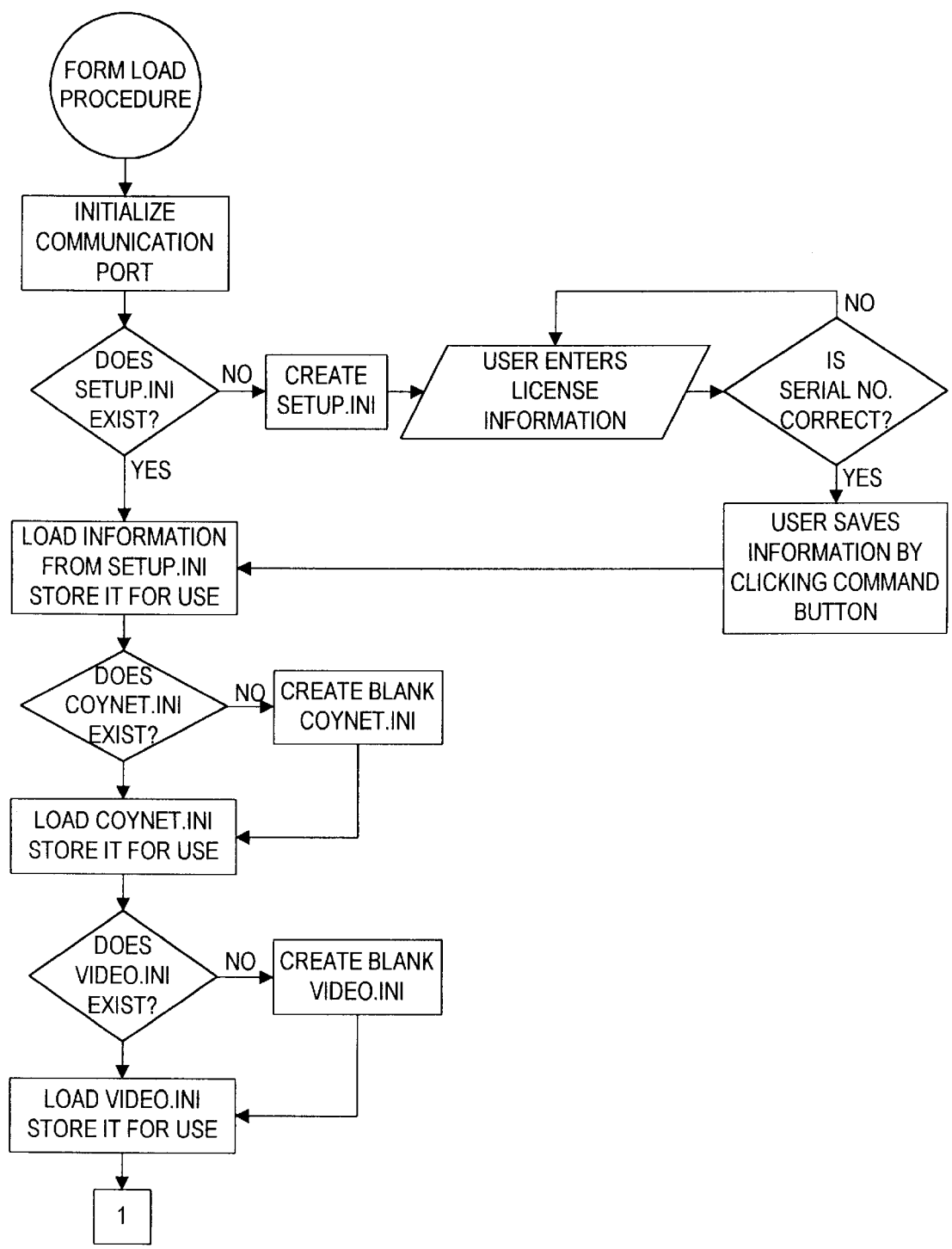

Referring now to FIG. 14, the form load logic is depicted therein. The form load procedure first initializes the communication port and then determines whether Setup.ini exists. If this program exists, the form load procedure loads in information from Setup.ini and stores it for use. If the Setup.ini does not exist, the form load procedure creates Setup.ini, enters user license information, verifies that the serial number is correct, prompts the user to save the license information, and returns to the step of loading information from the Setup.ini.

After Setup.ini has been stored for use, the form load procedure next determines whether a Coynet.ini file exists. If so, the form load procedure loads the Coynet.ini file and stores it for use. If not, the form load procedure creates a blank Coynet.ini file and then returns to the step of loading this file for use.

Figure 15:
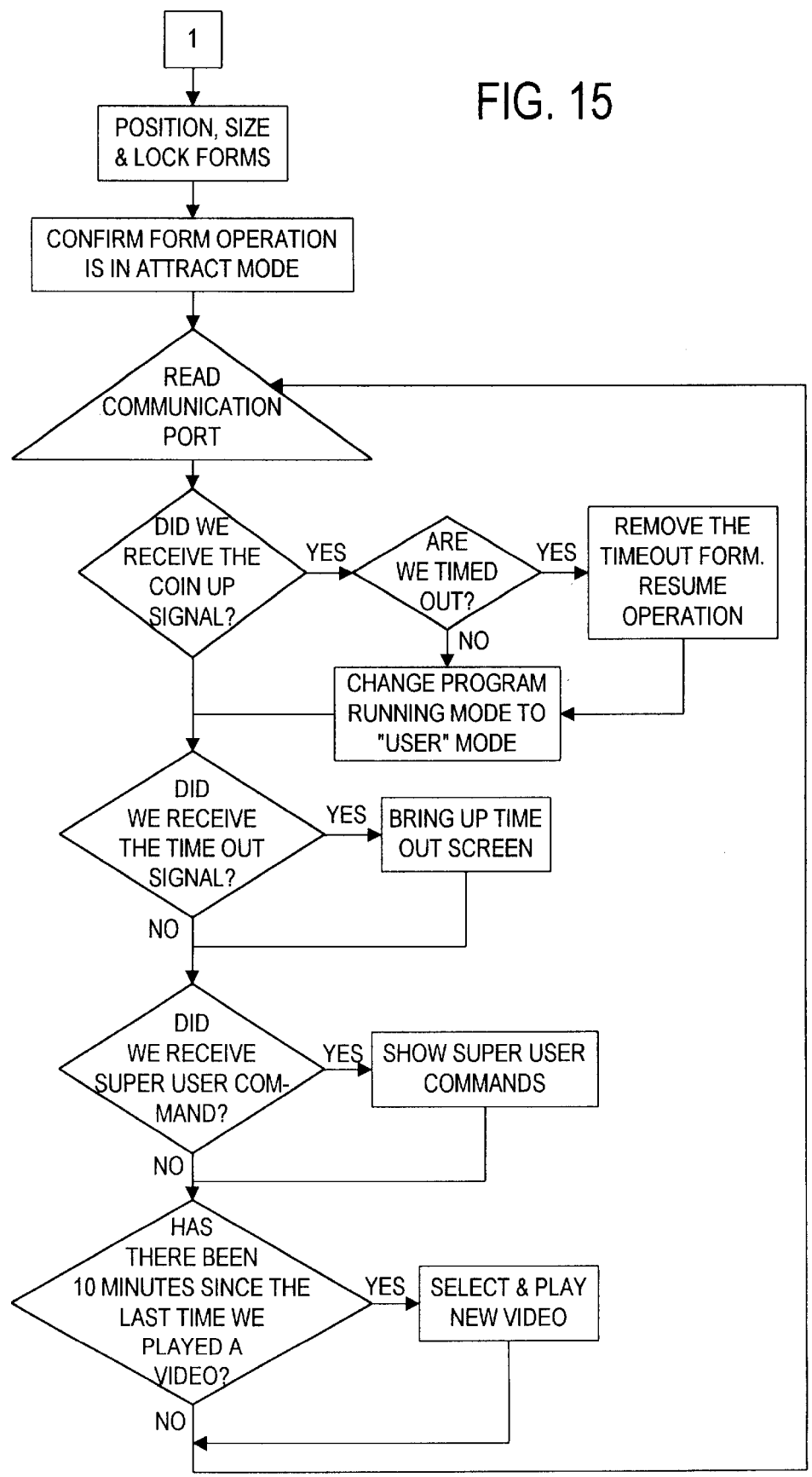

After the Coynet.ini file has been stored for use, the program next determines whether a Video.ini file exists. If so, this file is loaded and stored for use. If not, the form load procedure creates a blank Video.ini file and returns to the step of storing this file for use. The form load procedure then moves to the step of positioning, sizing, and locking forms and then confirms that the form operation is in a tracked mode. At this point, the logic moves from the form load procedure to the timer control procedure. The timer control procedure begins, as shown in FIG. 15, by reading the communication port. If the data read from this port indicates that a coin up signal has not been received, the timer control procedure moves to the step of determining whether a time out signal has been received. If the coin up signal was not received, the timer control procedure moves to the step of determining whether the program is timed out. If so, the procedure removes the time out form and resumes operation. If not, the routine changes the program running mode to user mode and returns to the step of determining whether the time out signal has been received.

If the time out signal has not been received, the timer control procedure determines whether a superuser command has been received. If the time out signal was received, a time out screen is brought up and then the procedure moves to the step of determining whether the superuser command has been received.

If the superuser command has not been received, the routine moves to the step of determining how long it has been since the last time the system has displayed a video for the user. If the superuser command was received, the timer control procedure makes the superuser commands available and moves on to the step of determining whether it has been 10 minutes since the last time a video was played. If the procedure determines that 10 minutes has elapsed, a new video is selected and played. If 10 minutes has not elapsed, the procedure returns to the initial step of reading the communication port.

Figure 16:
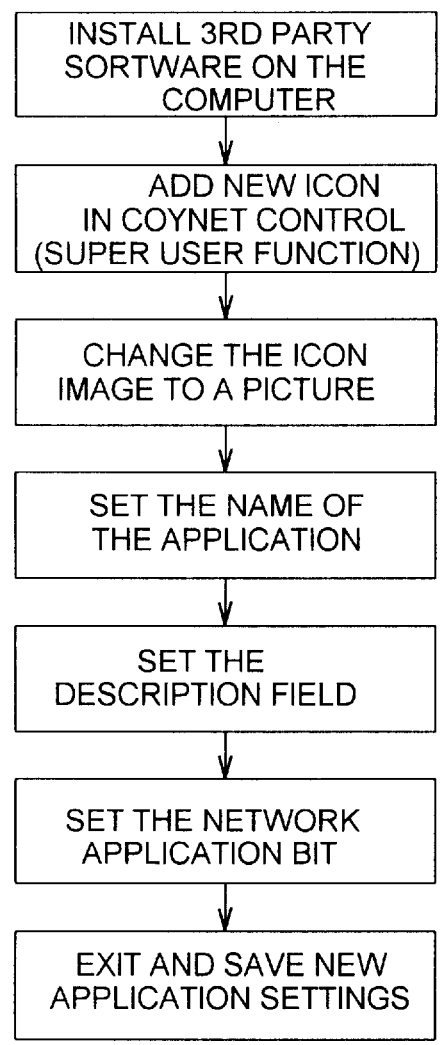

Referring now to FIG. 16, depicted therein is a third party software installation procedure. This procedure is available only to a superuser.

This procedure starts with the step of installing the third party software on the computer following the instructions therefor. The software installation procedure then adds a new icon into the control program software and changes the icon image to a picture. The software installation procedure then determines the name of the application that has been installed and requests that the user enter data into a description field. The software installation then determines whether the application loaded is a network application and sets the bit as appropriate. The software installation procedure then saves the new application settings and exits to the main program.

Figure 17:
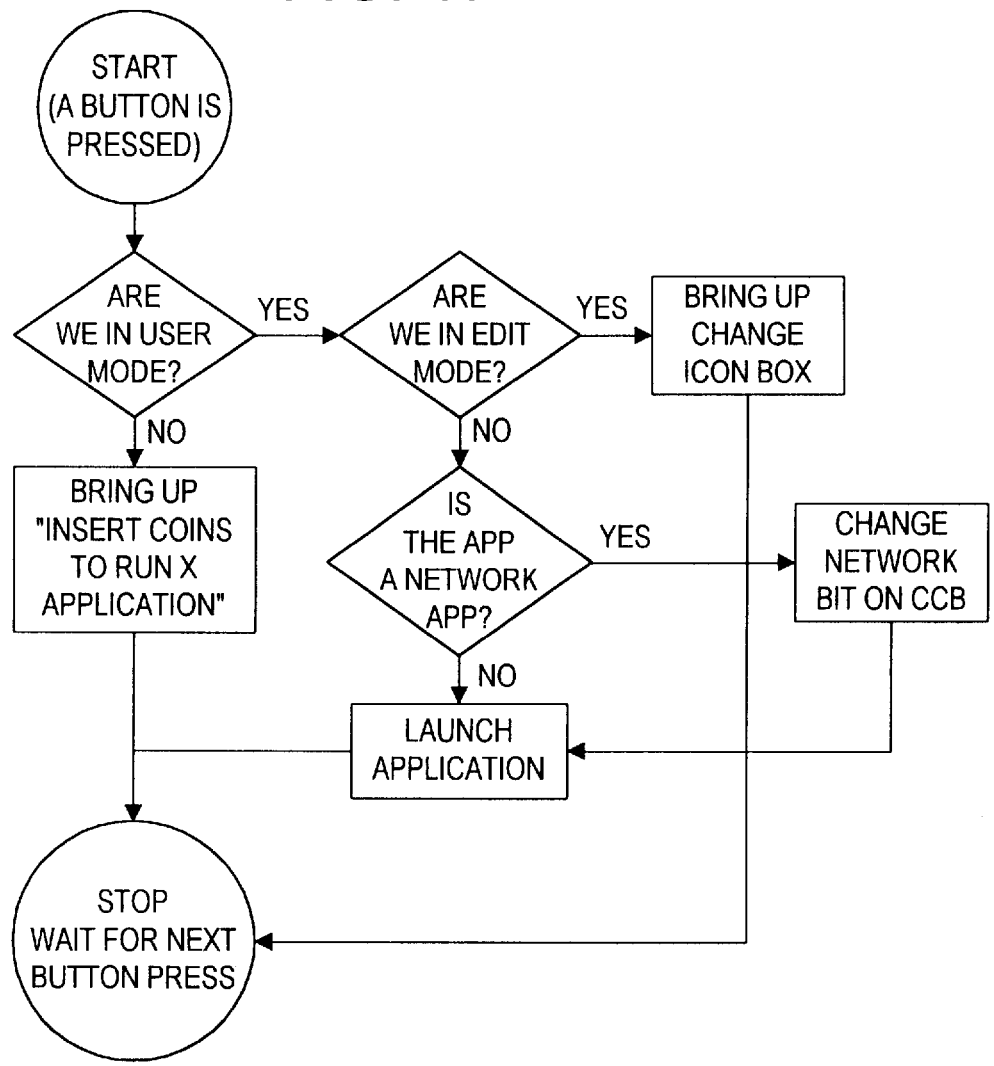

Referring now to FIG. 17, depicted therein is a launching applications procedure that may be run by the user. The launching applications procedure begins when a button is pressed indicating that the user wishes to run a desired third party application. If a button is pushed, the launching applications procedure determines whether the program is in user mode. If not, this procedure brings up an insert coins to run the selected applications message and then waits for the next button press.

If the control program software 22b is in user mode when a button is pushed, the launching applications procedure moves to the step of determining whether software 22b is in edit mode. If so, a bring up change icon box is presented and the procedure waits for the next button press. If the program is not in edit mode, the launching applications procedure determines whether the application selected is a network application. If not, the procedure launches the application and then waits for the next button press. If the selected application is a network application, the launching applications procedure changes the network bit on the control hardware device 22a before launching the application and waiting for the next button press.

The foregoing provides a basic understanding of the operation of the present invention. The following discussion will discuss in slightly more detail the set up and operation of the system 22 of the present invention, including discussions of certain details that are incorporated in the commercial version of this invention.

At this point, we will draw a distinction between the user of the system 20 and the owner of this system. The owner will purchase the system 20 and place it in an environment where it is available to potential users. The users will prepay to use the system 20 in some form as described basically above. The owner is responsible for setting up the system and maintaining it.

When the system 20 is initially delivered to the owner, the normal Windows 95 desktop will appear upon power up. The initial step in setting up the system 20 is to set up a secure dialer program included with the control program software 22b. In particular, the control program software 22b includes a secure dialer similar in basic function to the dialer included with Windows 95 but with several key differences.

In particular, the secure dialer is written so that it operates in the background, and the user cannot access or change the dialer setup. Even more specifically, when the secure dialer runs, the log-on user name and password are hidden from the customer. The dialer program built into Windows 95, on the other hand, displays at least some of this information to the user. The secure dialer of the present invention auto dials when a program requiring Internet access, such as Netscape, is started.

After the dialer is set up and it is determined that the computer platform 24 is operating properly, the next step is to insert several coins into the coin hopper. If the coin hopper is empty, the program will indicate that there are not refunds available as described above.

When the system 20 is initally tested, the user keyboard should be connected directly to the keyboard input of the computer hardware 26. This bypasses the security provided by the control hardware device 22a, but this is acceptable during testing of the system. Subsequently, the keyboard 30 should be connected to the computer hardware 26 through the control hardware device 22a.

At this point, the general purpose computing platform 24 of the system 20 should be working properly and displaying the normal Windows 95 desktop. The control program software 22b should be manually started in the same manner as any other Windows 95 application. The control program software starts out in the attract mode. Inserting coins into the hopper coins up the system into the paid mode.

After the coins have been deposited, the software allows the user 45 seconds of free time to start an application. If an application is selected that requires access to an Internet service provider, the user is given an additional 45 seconds of free time to allow a connection to be established with the Internet service provider. The software displays a telephone symbol when the control hardware device 22a detects that the modem is on-line. The telephone symbol disappears when the hardware device 22a detects that the modem is no longer on-line.

Referring again for a moment to FIG. 1, the grouping of the blocks in this diagram indicate which components are available to the user and which are internal to the system 20. In particular, the user can interact with the video monitor 60, coin hopper 62, user keyboard 30, quit button 66, and mouse 72. The remaining blocks in FIG. 1 are either software that runs on the hardware 26 or devices that are enclosed within a locked housing.

The quit button 66 has two functions. First, if the user presses and holds this button for at least 2 seconds, the firmware cashes out any remaining time and money to the customer and shuts down. The system then reboots. Under the second function, if the red quit button is momentarily pressed and released, the system will shut down and reboot. In this case, the customer's remaining money will be kept and credited to the user when the control program software 22b comes back up in paid mode. The user can thus continue with the remaining time and money credit.

Referring for a moment back to the process of installing the system 22, once the dialer program is set up and the computer platform 24 operating correctly, the owner can start the control program software 22b in full secure mode by clicking an icon labeled INITWIST on the desktop. The system 20 then shuts down and reboots. After it reboots, the system will start directly under the control of the control program software 22b every time the system is rebooted. The system 20 should be in this mode when placed in the situation where it is accessible by potential users.

If it is necessary to return to the Windows 95 desktop, the following process should be completed. First, the machine should be coined up by placing coins in the hopper such that the control program software is in the paid mode. Then, the superuser button on the control hardware device 22a is pressed, the software now presents an expanded menu of functions on the top of the screen. The control program software 22b is in superuser mode. In superuser mode, the owner can click on the file menu and then on the INITWIST icon. The system will then shut down and reboot back to the Windows 95 desktop.

The superuser mode gives the operator complete control over the PC. When in superuser mode, the user can install third party software applications, delete installed third party applications, set up dialer software subroutine, set up and edit help files, set up and edit multimedia advertising, access EXPLORER.EXE or PROGMAN.EXE, or DOS, exit the control program software 22b, and set up the control program software browser.

Another important process in setting up the system 20 is identifying which applications loaded on the computer platform 24 are available to the user. This process comprises the steps of entering superuser mode or running the software in a mode other than a secured mode. The user then develops a program set for each application software program 36. The program set includes an icon, program name and info box that are available to the user. Additional material that may be provided to the user is an informational video or screen shots showing how the application will work.

When the control program software runs in secured mode, the control hardware device 22a limits the ability of the user keyboard 30 to transmit signals to the keyboard input of the computer hardware 26. Any time the user keyboard is disconnected from the computer hardware 26, the dummy keyboard 42 is connected thereto. The dummy keyboard 42 comprises simple electronics to mimic the operation of a functioning keyboard so that, when the operating system 32 boots up, it will not halt boot-up due to the absence of a functioning keyboard.

The control hardware device 22b connects the dummy keyboard to the computer hardware from a cold start (power up). The only time during which the user keyboard 30 is connected to the keyboard input of the computer hardware 26 is when the control software program 22b is in its paid mode or when the software 22b is not in its secured mode.

The user keyboard 30 is disconnected from the keyboard input under three conditions. The first condition is when the customer's time expires. The control hardware device 22a disconnects the user keyboard 30, disconnects the dummy keyboard 42, and prompts the user to deposit money. If the customer deposits money, then control is switched back to the user keyboard 30. If the customer does not deposit money within a specified period of time, the control hardware device 22 performs a hard reset on the PC.

The second condition in which the user keyboard 30 is disabled is when the customer quits. A mentioned above, by holding the quit button down for several seconds, the program resets the computer hardware 26 and refunds the user's money. In the second case, the hardware 26 is simply reset and any remaining money is credited to the user when the system reboots. In either case, keyboard control is switched to the dummy keyboard.

The third situation in which the user keyboard 30 is disabled is when an unauthorized user attempts to gain unauthorized access to the system 20. In this case, the control hardware device 22a determines whether the communications from the control program software 22b is disrupted, indicating that the program software 22b is closed. In this case, the control hardware device 22a connects the dummy keyboard 42 to the computer hardware 26.

Similarly, as described above the control hardware circuit 40 is connected to the video control board 56 in a manner that allows the circuit 40 to switch the monitor 60 on or off. The video monitor 60 is turned off under the same three conditions under which the user keyboard 30 is disconnected from the computer hardware 26. The monitor is, however, turned back on as soon as the control program software 22b restarts so that the attract mode is visible to the user, even though the dummy keyboard 42 is connected to the keyboard input.

As mentioned briefly above, the process of setting up the control program software involves entering a serial number and verifying the serial number. These codes are used to activate the control program software's ability to operate in paid mode. If the serial number is not verified, the system 20 operates as a free play machine.

The procedure for first time set up is as follows: the client system 20 transmits a ready for first time set up signal to a server system over the Internet; the server system acknowledges with a unique code. This code is used in combination with the client machines two unique codes; the three codes are mathematically processed by the client system 20 and the resulting new code is sent to the server; the server determines whether this code is correct. If the code is incorrect, the server logs off. If the number is correct, the server sends an activation code and the client system 20 performs set up. The client system 20 responds to the server indicating that it is set up. The server replies yes or no. All of these steps are performed using the Internet to transmit the activation data between the client system 20 and the remote server.

In the foregoing example, the control program software 22b was described as operating on a Windows 95 platform. This program can also be adapted to run on a Windows 3.11 platform, a Windows NT platform. What these and other platforms have in common is that they have a separate graphical user interface that is presented to the user. In each of these platforms, the control program software can be modified to replace the original graphical user interface with the interface of the control program software 22b. The system 22 thus may be easily adapted for use on platforms other than the Windows 95 platform.

Another modification of the basic idea shown in FIG. 1 is to replace the coin hopper 62 with credit, debit, or other devices for accepting payment.

The use of the system 20 can also be predicated on conditions other than payment of money. For example, if the coin hopper 62 is replaced with a modem such as the modem 70, the system 20 can be modified to act as a fire wall to prevent unauthorized access to the system 20. The control hardware circuit 40 can be programmed to interrogate the modem replacing the coin hopper 62 to determine where a call is being placed from and whether an access code is correctly entered. If so, the control hardware circuit 40 can cause the control program software 22 to enter the paid mode and allow access to the system 20.

Accordingly, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

APPENDIX A

Coynet Controller Board User Programming & Diagnostics

Glossary

ISP—Internet Service Provider

Any type of access to the Internet, be directly through a server or through a telephone line connection.

CCB—Coynet Controller Board.

The 4½"×6" PCB that controls coin inputs and outputs, keyboard switching, computer interfacing, money counting and time keeping in the Coynet machine.

VFD—Vacuum Fluorescent Display.

It is the blue/green, 20 character display connected to the Coynet Controller Board.

Coin Changer

The CCB controlled, motor driven coin refund machine.

RESET switch

The small push-button located in the top centre of the CCB. Located near the power wires.

PROG button

The left switch of a group of three large push-button switches located in the top right of the CCB. It is the one closest to the centre of the CCB. Used to enter programming mode and toggle the diagnostic features.

DOWN button

The right switch of a group of three large push-button switches located in the top right of the CCB. Used to scroll down the list of programming and diagnostic features.

UP button

The middle switch of a group of three large push-button switches located in the top right of the CCB.

Used to scroll up the list of programming and diagnostic features.

Super User Button

The small push-button located in the bottom centre of the CCB. Located next to the RJ-11 telephone jack. Used to set the Coynet windows shell into super user mode for editing etc.

Entering Programming Mode.

Press and hold the PROG button.

Press and release the RESET button.

When the VFD blanks, release the PROG button.

The VFD will show Programming Mode

Use the UP & DOWN buttons to scroll through the Programming Mode selections.

To change a programming feature, press the PROG button.

A small p will be displayed on the far right of the VFD.

Change the value of the prompt using the UP and DOWN buttons.

To save the new value by pressing the PROG button.

Programming Options (Actual VFD prompts are shown in boldface for the rest of this document.)

On Line:$6.00/hr

The rate (in pounds per hour) used to calculate time remaining when the Coynet machine is on-line to an Internet provider.

Press the PROG button. The programming p will be displayed on the far right of the VFD.

Use the UP & DOWN buttons to set the rate (in $0.05/hr increments)

Press the PROG button to save the new value. The programming p will disappear.

Offline:$3.00/hr

The rate (in pounds per hour) used to calculate time remaining when the Coynet machine is not on-line to an ISP, but is operating in a games mode.

Programming as: On Line rate

Coin Slot1:$0.25

The amount by which the current money count will be incremented if a coin is deposited in coin slot 1.

Programming as: On Line rate.

Coin Slot2:$1.00

The amount by which the current money count will be incremented if a coin is deposited in coin slot 2.

Programming as: On Line rate.

Min Start:$1.00

This is the minimum amount of money that must be deposited to begin a new session.

Programming as: On Line rate.

Money In:$0.00

The total amount of money deposited into the coin slots machine.

Can be reset to $0.00 by pressing the PROG button

Money Out:$0.00

The total amount of money dispensed by the coin changer.

Can be reset to $0.00 by pressing the PROG button

Time Online :0000:00

The total number of hours (up to 9999) and minutes (up to 60) that the Coynet machine has spent on-line with an ISP Time Offine :0000:00

The total number of hours (up to 9999) and minutes (up to 60) that the Coynet machine has spent off-line, but still active (in a games mode for example)

Modem Act Online / PC Act Online

Sets the flag to her on-line status is determined by the PC parallel port fine or the CCB on-line detect circuit Can be toggled by pressing the PROG button Display Time On / Display Time Off Sets the flag to determine if the remaining time is displayed along with the money remaining or if just the remaining money is displayed.

Can be tow by pressing the PROG button

Free Time 45 Sec

The number of seconds used by the CCB program to determine free time and dial time Programming as: On Line rate.

RTC: 12:00:00

Real Time Clock. A feature provided by the microprocessor, but not currently used by the CCB software for any purpose.

To set the RTC:

Press the PROG button. hh will be displayed, indicating that the hour is are being programmed.

Use the UP & DOWN buttons to set the hour.

Press the PROG button. mm will be displayed while the minutes are being programmed.

Use the UP & DOWN buttons to set the minutes.

Press the PROG button. ss will be displayed while the seconds are being programmed.

Use the UP & DOWN buttons to set the seconds.

Press the PROG button to end the RTC programming.

Diagnostics

Submenu of commands used to trouble-shoot the Coynet machine.

Press the PROG button. The prompt will change to Diagnostics Mode.

From this point on, use the UP & DOWN buttons to scroll through the diagnostic options and the PROG button to activate and deactivate the option.

Coin Changer On/Coin Changer Off

Turns the coin changer on and off.

Monitor On / Monitor Off

Turns the monitor on and off.

Quit Button Bulb On / Quit Button Bulb Off

Turns the quit button light on and off.

Keyboard On / Keyboard Off

Switches the keyboard port between the external and internal keyboards.

PC/Modem Active / PC/Modem Reset

Toggle the computer's reset line.

Buzzer On / Buzzer Off

Turns the CCB's warning buzzer on and off.

Modem Online Detect / Modem Online DetectΛ

Used to check the CCB's on-line detect circuit. Plugging a telephone line into the RJ-11 jack will cause the symbol on the right of the VFD to disappear.

PC Online Detect / PC Online Detect Λ

Used to check the PC's on-line signal circuit. Toggling the PC's on-line signal will cause the symbol on the right of the VFD to disappear.

Low Coin / High Coin

Used to check the coin changer's low coin detector. Emptying the coin changer's hopper will cause the CCB to display Low Coin. Filling the hopper will cause the CCB to display High Coin.

Low Coin in Counter / High Coin Counter

Used to check the coin changer's coin counter. Flicking the coin changer's coin counter will cause the prompt to toggle between Low Coin Counter and High Coin Counter.

Coin #1 Deactivated / Coin #1 Activated

Used to check the coin #1 input. Grounding the coin #1 input will cause the CCB to display the activated signal.

Coin #2 Deactivated / Coin #2 Activated

Used to check the coin #2 input. Grounding the coin #2 input will cause the CCB to display the activated signal.

Parallel Port 1 1

Used to check the two data input lines from the computer. Grounding the data lines from the PC will cause the ones to change to zeroes.

Money Sig. Off / Money Sig. On

Used to toggle the money signal to the computer on and off.

APPENDIX B

| Part # | COYNET Part Description |
|---|---|
| B1 | Lithium Battery |
|  | Battery Holder |
| C1 | .02 uF Cap |
| C2 | .1 uF Cap |
| D1–D4 | 1N4007 |
| D5–D8 | 1N5353 Zener |
| J1 | 16 Pin Header |
| J2–J3 | MAS Header |
| J4 | 40 Pin Connector |
| J5–J7 | 5 Pin DIN Jack |
| J8 | PCB Telephone Jack |
| P1, P2 | 16 Pin IDC |
| P2–P3 | MAS Connecior |
| P5 | 25 Pin D Subminature |
| P6–7 | 5 Pin DIN Plug |
| P8 | 16 Pin Headr |
| PZ1 | Piezo Buzzer |
| Q1 | 2N6073A Triac |
| Q2 | 2N4922 SCR |
| R1 | 2.4K |
| R2 | 180 |
| R3 | 1K |
| R4 | 470 |
| R5 | 5K |
| R6 | 470 |
| R7 | 2.2K |
| RB1–RB3 | SIP 10K Resistor bank |
| S1–S3 | Miniature Switch (large) |
| S4–S5 | Miniature Switch (small) |
| U1–U2 | 8 Bit Bus Transceiver |

APPENDIX B-continued

COYNET

| Part # | Part Description |
|---|---|
| U3 | Addressable Latch |
| U4 | Hex Bus Driver |
| U5, U7 | 4N28 Optocoupler |
| U6 | 3010 Optocoupler |
| U8 | Quad 2 to 1 MUX |
| | 5' Shielded Multi Conductor |
| | 5' Ribbon Cable |
| | 25 Pin D Cover |

APPENDIX C

| Name | Inputs | Outputs | Function |
|---|---|---|---|
| Initialize_Outputs | None | None | Sets the output flip-flops to their start-up states; initializes any custom symbols for the VFD; sets the VFD into flickerless mode |
| Piezo | Duration of buzzer alert in MSEC | None | Turns on the buzzer for a given number of milliseconds, then turns it off |
| RTC | None | None | Displays the real time clock of the microprocessor module |
| Set_RTC | None | None | Used by the Programming subroutine to set the time on the real time clock of the microprocessor module |
| Change_Rates | A number representing which rate is to be adjusted | None | Allows the operator to change the various rates used by the CCB program to calculate remaining time and money |
| Read_Prog_Switches | None | A number representing the state of the programming switches on the CCB | Used to input data into the D0_Diagnostics and Programming subroutines |
| Process_Refund | Money remaining | Number of coins to be counted by the coin changer | Calculates & displays the user's refund |
| Display_Money | Money remaining, on-line status of the machine, buzzer flag | None | Displays the money and time remaining; displays the on-line status of the machine; sound the buzzer alert if time remaining drops below set value |
| Clear_Display | Clear display flag | None | Either clears the VFD and returns the cursor to the left-hand side or just returns the cursor to the left-hand side |
| Display_VFD | Any string up to 20 characters | None | Sends the input string to the VFD; alters the $ symbol according to the currency programming |
| Programming | None | None | Allows the operator to perform various accounting procedures using the CCG program; allows the operator to set the operating parameters of the CCB program; allows the operator to access the diagnostic subroutine of the CCB program |
| Do_Diagnostics | None | None | Allow the operator to perform various diagnostics on the CCB board and its peripherals |

What is claimed is:

1. A method of converting a general purpose computing platform into a limited access computer system that allows a user limited access to at least one application program installed on the general purpose computing platform, the method comprising the steps of:

connecting a control hardware device to a communications port of the general purpose computing platform, where the control hardware device comprises means for booting up the general purpose computing platform;

installing a control software program on the general purpose computing platform;

altering the general purpose computing platform such that the control software program runs whenever the general purpose software program boots up;

booting up the general purpose computing platform to form the limited access computer system; and establishing a communication link between the control software program and the control hardware device, where the control hardware device re-boots the general purpose computing platform to form the limited access computer system whenever the communication link between the control software program and the control hardware device is disrupted.

2. A method as recited in claim 1, further comprising the step of connecting the control hardware device to a display subsystem of the general purpose computing platform such that the control hardware system inhibits operation of the display subsystem whenever the general purpose computing device boots up.

3. A method as recited in claim 2, further comprising the step of connecting the control hardware device to a user input subsystem of the general purpose computing platform such that the control hardware system inhibits operation of the user input subsystem whenever the general purpose computing device boots up.

4. A method as recited in claim 3, further comprising the step of providing a superuser button on the control hardware device, where the control software program operates in at least a superuser mode in which the user has access to all features of the control software program, where manually depressing the superuser button allows the control software program to enter the superuser mode.

5. A method as recited in claim 4, in which the control software program additionally operates in an attract mode and a paid mode, where the control software program can enter the superuser mode only from the paid mode.

6. A method as recited in claim 1, further comprising the step of connecting the control hardware device to a user input subsystem of the general purpose computing platform such that the control hardware system inhibits operation of the user input subsystem whenever the general purpose computing device boots up.

7. A method as recited in claim 1, where control software program operates in an attract mode if the user has no monetary credit and in a paid mode when the user has monetary credit, where the user cannot access the at least one application program if the control software program is in the attract mode.

8. A method as recited in claim 7, further comprising the steps of:

determining an amount of monetary credit established by the user; and calculating a use time during which the control software program is in the paid mode based on the amount of monetary credit and at least one use rate.

9. A method as recited in claim 8, further comprising the steps of:

generating an on-line signal when the limited access computing system is connected to a communications network;

calculating the use time based on a first use rate if the on-line signal is not present; and calculating the use time based on a second use rate if the on-line signal is present.

10. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device;

the control software program controls the user's access to the at least one application software program based on the status of the access-status device;

the control software program operates in a superuser mode, where certain features of the control software program are available only when the control software program operates in the superuser mode; and the control hardware device comprises a superuser button that must be manually depressed for the control software program to operate in the superuser mode.

11. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device;

the control software program controls the user's access to the at least one application software program based on the status of the access-status device;

the control software program operates in an attract mode and in a paid mode based on the status of the access-status device, where the user can access the at least one application software program when the control software program is in the paid mode and the user cannot access the at least one application software program when the control program is in the attract mode;

the control software program operates in a superuser mode, where certain features of the control software program are available only when the control software program operates in the superuser mode; and the control hardware device comprises a superuser button that must be manually depressed for the control software program to operate in the superuser mode.

12. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device;

the control software program controls the user's access to the at least one application software program based on the status of the access-status device; and the control software program further comprises a dialer program, where the dialer program establishes a connection with an appropriate internet service provider without generating any user output data.

13. A computer system as recited in claim 12, in which the dialer program automatically establishes a connection with the appropriate internet service provider when the user starts a given one of the at least one application software programs that requires such a connection.

14. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device;

the control software program controls the user's access to the at least one application software program based on the status of the access-status device; and the control hardware device comprises a reset means for initiating a hardware reboot of the general purpose computing platform.

15. A computer system as recited in claim 14, in which the control hardware device inhibits operation of the user output means when the reset means initiates a hardware reboot.

16. A computer system as recited in claim 14, in which the reset means comprises a first reset means that initiates a hardware reboot based on a status of the control software program.

17. A computer system as recited in claim 16, in which:

the control hardware device further comprises a reset button; and the reset means comprises a second reset means that initiates a hardware reboot based on a status of the reset button.

18. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device; the control software program controls the user's access to the at least one application software program based on the status of the access-status device; and the control hardware device comprises an online detect circuit for detecting when the general purpose computing platform is accessing a communications network.

19. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device;

the control software program controls the user's access to the at least one application software program based on the status of the access-status device; and the control hardware device determines an amount of use time that the user can access the at least one application program based on the status of the access-status device.

20. A computer system as recited in claim 19, in which the control hardware device comprises an online detect circuit for generating an online signal when the general purpose computing platform is accessing a communications network, where the control hardware device determines the amount of use time further based on:

a first use rate when the online detect circuit does not generate the on-line signal; and a second use rate when the online detect circuit generates the on-line signal.

21. A computer system as recited in claim 19, in which the hardware control device increases the amount of use time by a predetermined amount if the use time is non-zero and the general purpose computing platform reboots.

22. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device; and the control software program controls the user's access to the at least one application software program based on the status of the access-status device;

the hardware control device inhibits operation of the user input means based on at least one of a list of conditions comprising
the status of the access-status device,
normal operation of the control software program, and
the user's decision to quit the at least one application program; and the control hardware device further comprises
dummy input means for simulating the presence of the user input means, and
means for connecting the dummy input means to the processing means when the control hardware device inhibits operation of the user input means.

23. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device;

the control software program controls the user's access to the at least one application software program based on the status of the access-status device; and the access-status device comprises:
money handling means for generating a credit signal indicative of an amount of money credited to the user; and the control hardware device comprises credit control means for controlling the money handling means to accept and refund money.

24. A computer system in which access by a user to software applications running on the computer system is restricted, comprising:

a general purpose computing platform comprising
processing means for running an operating system software program;
communications port means for controlling transfer of hardware data between the processing means and external hardware devices,
user input means connected to the processing means for transferring input data from the user to the processing means, and
user output means connected to the processing means for communicating output data from the processing means to the user;

an access-status device;

a control hardware device connected to the port means of the general purpose computing platform and to the access-status device;

at least one application software program adapted to run on the general purpose computing platform;

a control software program adapted to run on the general purpose computing platform, the control software program being in communication with the control hardware device through the port means; wherein the control hardware device determines a status of the access-status device;

the control software program controls the user's access to the at least one application software program based on the status of the access-status device; and the hardware control device further comprises a dummy input means, wherein the hardware control device disconnects the user input means from the processing means, connects the dummy input means to the processing means, and inhibits operation of the user output means based on at least one of a list of conditions comprising the status of the access-status device, normal operation of the control software program, and the user's decision to quit the at least one application program.

* * * * *